US011706847B2

(12) United States Patent
Ohrmann et al.

(10) Patent No.: US 11,706,847 B2
(45) Date of Patent: Jul. 18, 2023

(54) METHOD FOR AUTOMATICALLY CORRELATING AT LEAST ONE COOKTOP UTENSIL WITH AT LEAST ONE COOKING ZONE OF AN INDUCTIVE COOKTOP, INDUCTIVE COOKTOP, COOKTOP UTENSIL AND SYSTEM FOR CARRYING OUT THE METHOD

(71) Applicant: Miele & Cie. KG, Guetersloh (DE)

(72) Inventors: Niels Ohrmann, Guetersloh (DE); Volker Ennen, Enger (DE); Daniel Ebke, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 884 days.

(21) Appl. No.: 16/540,095

(22) Filed: Aug. 14, 2019

(65) Prior Publication Data
US 2020/0059995 A1 Feb. 20, 2020

(30) Foreign Application Priority Data
Aug. 16, 2018 (DE) ............ 10 2018 119 965.1

(51) Int. Cl.
H05B 6/12 (2006.01)
H05B 6/06 (2006.01)
H05B 6/44 (2006.01)

(52) U.S. Cl.
CPC ........... *H05B 6/062* (2013.01); *H05B 6/1236* (2013.01); *H05B 6/44* (2013.01)

(58) Field of Classification Search
CPC . H05B 6/062; H05B 2213/06; H05B 2213/05
See application file for complete search history.

(56) References Cited

U.S. PATENT DOCUMENTS 4,319,109 A * 3/1982 Bowles ............... H05B 6/062
219/622
6,206,564 B1 * 3/2001 Adamczewski ...... A47J 45/068
99/344
(Continued)

FOREIGN PATENT DOCUMENTS

DE 102010039071 A1 2/2012
DE 102015222797 A1 * 5/2017
(Continued)

OTHER PUBLICATIONS

Power Chart for Appliance, retrieved from https://www.donrowe.com/usage-chart-a/259.htm (Year: 2015).*

*Primary Examiner* — Helena Kosanovic
*Assistant Examiner* — Lawrence H Samuels
(74) *Attorney, Agent, or Firm* — Leydig, Voit & Mayer, Ltd.

(57) ABSTRACT

A method for automatically correlating at least one cooktop utensil with at least one cooking zone of an inductive cooktop having a plurality of cooking zones which are inductively heated by at least one respective heating coil, includes: providing the cooktop with a cooktop controller configured to drive the heating coils with a correlation signal; providing the at least one cooktop utensil with an induction coil inductively couplable with the heating coils of the cooktop and a transmitter unit; supplying the transmitter unit with an operation power when a voltage is induced by at least one of the heating coils into the induction coil of the cooktop utensil that is placed on the cooking zone associated with this heating coil; transmitting, by the transmitter unit of the cooktop utensil, by the operating power, a response signal that identifies the cooktop utensil and correlates with the induced correlation signal.

44 Claims, 7 Drawing Sheets

(56) References Cited

U.S. PATENT DOCUMENTS

| | | | | |
|---|---|---|---|---|
| 6,320,169 | B1* | 11/2001 | Clothier | G06K 7/0008 |
| | | | | 340/572.1 |
| 6,953,919 | B2* | 10/2005 | Clothier | H05B 6/062 |
| | | | | 219/494 |
| 9,155,130 | B2* | 10/2015 | Shan | H05B 6/062 |
| 2010/0116819 | A1* | 5/2010 | Pan | H05B 6/12 |
| | | | | 219/621 |
| 2010/0147832 | A1 | 6/2010 | Barker, III et al. | |
| 2012/0000903 | A1* | 1/2012 | Baarman | H05B 6/1236 |
| | | | | 219/620 |
| 2015/0257576 | A1* | 9/2015 | Yorukoglu | A47J 36/00 |
| | | | | 99/342 |
| 2016/0095169 | A1* | 3/2016 | Sanchez | H05B 6/1209 |
| | | | | 219/622 |
| 2017/0122569 | A1* | 5/2017 | Johnson | H04W 4/70 |
| 2019/0125120 | A1* | 5/2019 | Jenkins | A47J 37/10 |
| 2019/0293470 | A1* | 9/2019 | Lim | G01F 23/22 |
| 2022/0007873 | A1* | 1/2022 | Collinson | A47J 27/211 |

FOREIGN PATENT DOCUMENTS

| | | |
|---|---|---|
| DE | 102015222797 A1 | 5/2017 |
| EP | 3001771 B1 | 3/2016 |

\* cited by examiner

METHOD FOR AUTOMATICALLY CORRELATING AT LEAST ONE COOKTOP UTENSIL WITH AT LEAST ONE COOKING ZONE OF AN INDUCTIVE COOKTOP, INDUCTIVE COOKTOP, COOKTOP UTENSIL AND SYSTEM FOR CARRYING OUT THE METHOD

CROSS-REFERENCE TO PRIOR APPLICATION

Priority is claimed to German Patent Application No. DE 10 2018 119 965.1, filed on Aug. 16, 2018, the entire disclosure of which is hereby incorporated by reference herein.

FIELD

The present invention relates to a method for automatically correlating at least one cooktop utensil with at least one cooking zone of an inductive cooktop, an inductive cooktop, a cooktop utensil and a system for carrying out the method.

BACKGROUND

EP 3 001 771 B1 describes a method for detecting the identity of a pot on a cooking zone of a cooktop, as well as a system of a cooktop with a pot. The cooktop has a pot-sensing means intended to detect the presence of a pot on the cooking zone. The pot has a temperature sensor and a transmitter, the transmitter being intended to transmit at least two sets of data to a receiver of a cooktop controller. The first data set is intended as an identification means for an individual pot, while the second data set is intended to relate to the temperature condition of the pot measured by the temperature sensor. When the pot-sensing means detects the presence of any pot, a heating element is to be activated by way of a power profile template to cause a temperature change in the pot placed on the cooking zone. Due to the thermal capacity of the pot, the temperature change is always delayed with respect to the power profile template. The temperature information sent back to the cooktop controller should then be used to determine whether the temperature profile detected by the temperature sensor at the pot corresponds to the power profile template generated by the heating element. If the temperature profile and the power profile template correspond to each other, the pot with the pot identifier should be detected as being placed on this cooking zone.

SUMMARY

In an embodiment, the present invention provides a method for automatically correlating at least one cooktop utensil with at least one cooking zone of an inductive cooktop having a plurality of cooking zones which are inductively heated by at least one respective heating coil, the method comprising: providing the cooktop with a cooktop controller configured to drive the heating coils with a correlation signal; providing the at least one cooktop utensil with an induction coil inductively couplable with the heating coils of the cooktop and a transmitter unit; supplying the transmitter unit with an operation power when a voltage is induced by at least one of the heating coils into the induction coil of the cooktop utensil that is placed on the cooking zone associated with this heating coil; transmitting, by the transmitter unit of the cooktop utensil, by the operating power, a response signal that identifies the cooktop utensil and correlates with the correlation signal induced into the induction coil of the cooktop utensil by at least one of the heating coils associated with the cooking zone to a receiver unit of the cooktop controller or of a third device that is in signal communication with the cooktop controller; comparing the response signal, in an evaluation unit of the cooktop controller or of the third device, which evaluation unit is connected in signal communication with the receiver unit, to the correlation signal of the at least one heating coil of this cooking zone; and correlating the identified cooktop utensil with the cooking zone as a function of the comparison.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
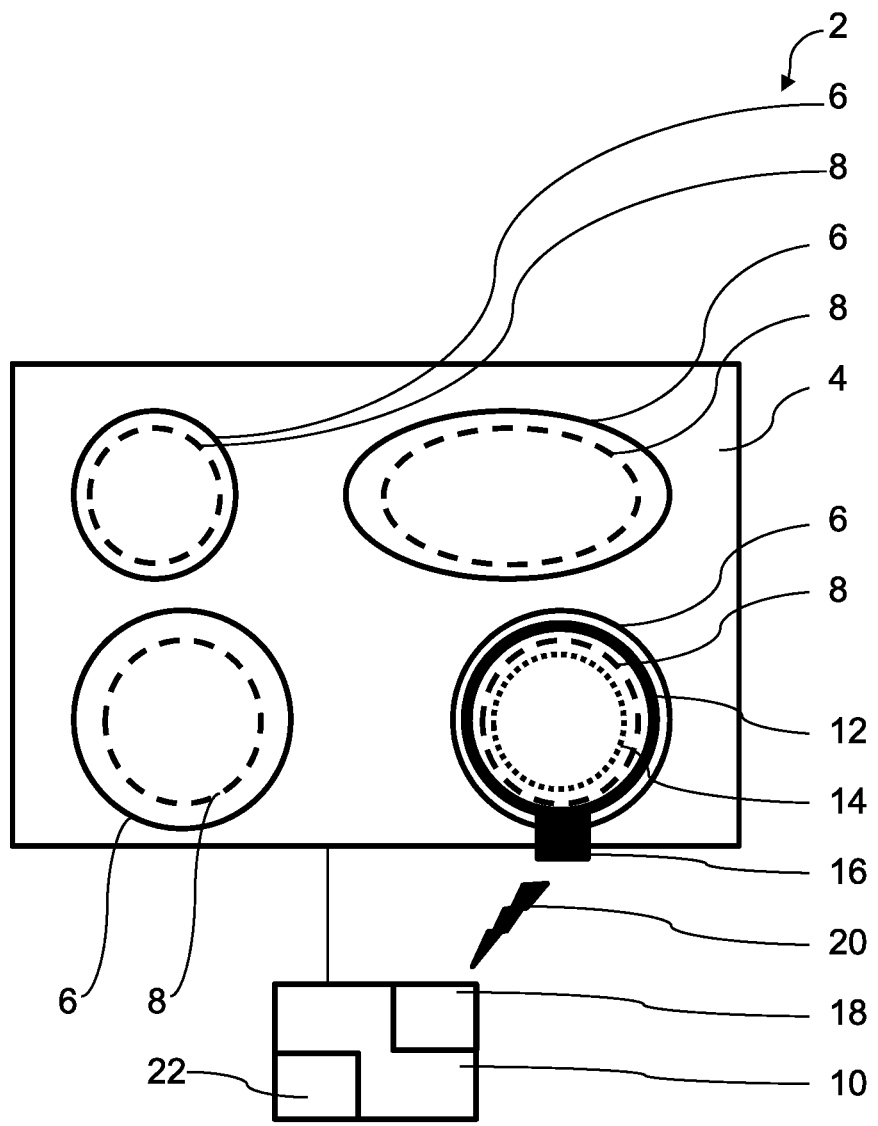
FIG. 1 shows an exemplary embodiment of an inventive system for carrying out a method according to the present invention.

The present invention improves the automatic correlation of at least one cooktop utensil with at least one cooking zone of an inductive cooktop.

In an embodiment, the present invention provides a method having the features described herein for automatically correlating at least one cooktop utensil with at least one cooking zone of an inductive cooktop, an inductive cooktop having the features described herein, a cooktop utensil having the features described herein, and by a system for carrying out such as method having the features described herein.

Among the advantages provided by the present invention is, in particular, that no power source needs to be provided on the at least one cooktop utensil for the transmitter unit thereof. The power required by the transmitter unit is generated from the voltage induced into the induction coil of the cooktop utensil. Preferably, when a voltage is induced by at least one of the heating coils into the induction coil of the cooktop utensil that is placed on the cooking zone associated with this heating coil, the transmitter unit is supplied with an operation power and thereby driven in such a manner that the transmitter unit of the cooktop utensil transmits the response signal to the receiver unit by means of the operation power. Thus, the automatic correlation of the at least one cooktop utensil with the at least one cooking zone is implemented in a simple manner in that the driving of the at least one heating coil of the cooking zone on which the cooktop utensil is placed with the correlation signal simultaneously causes the response signal that identifies the cooktop utensil and correlates with the correlation signal induced into the induction coil of the cooktop utensil by at least one of the heating coils associated with this cooking zone to be transmitted to the receiver unit of the cooktop controller, which is in signal communication with the evaluation unit, or of a third device connected in signal communication with the cooktop controller. It is conceivable, for example, that one or more features of the respective correlation signal, such as, for example, rising edges, falling edges, signal duration, maxima and/or minima, may trigger transmission of the response signal by way of the transmitter unit of the respective cooktop utensil. If multiple heating coils are associated with a cooking zone, only one of these heating coils needs to be driven with a correlation signal.

Accordingly, in accordance with the present invention, the operating power required to transmit the response signal is generated, and the transmission process itself is triggered, by the voltage induced into the induction coil of the cooktop utensil. Moreover, the transmission of a response signal (e.g., a power profile) that correlates with the correlation signal induced into the induction coil of the cooktop utensil enables the at least one cooktop utensil to be correlated faster with the at least one cooking zone of an inductively heated cooktop having a plurality of cooking zones. During the automatic correlation, substantially no time delay occurs due to properties of the at least one cooktop utensil, for example due to a temperature measurement at a cooktop utensil in the form of a pot which temperature measurement correlates to the induced power profile. Thus, the response signal does not relate to a temperature measurement or the like, but correlates directly with the correlation signal.

In the context of the driving of the heating coils of the cooking zones and in the context of the induction of the induction coil of the at least one cooktop utensil, the term "correlation signal" is to be understood in a general sense. Accordingly, the correlation signal may, for example, be a power profile. The correlation signal may exhibit an exceeding of a predetermined limit value or an undershooting of a predetermined limit value. Also conceivable are an interruption of power as well as a reduction or an increase in power. Also possible are, for example, more or less complex power profiles exhibiting ramps and/or step functions and/or variable distances between power peaks/power valleys and/or variable durations of power peaks/power valleys. The above explanations regarding the power of a correlation signal in the form of a power profile apply analogously to a correlation signal in the form of a current or voltage. The above explanations are merely exemplary and thus not exhaustive.

The driving of the heating coils of the cooking zones of the cooktop for automatically correlating the at least one cooktop utensil with at least one cooking zone of the plurality of cooking zones of the inductively heated cooktop can, in principle, be freely selected within wide suitable limits. A refinement of the method according to the present invention advantageously provides that the heating coils of the cooking zones of the cooktop be driven successively for purposes of automatic correlation. In this way, the automatic correlation is implemented in a technically particularly simple manner. This is because at each point in time, only one heating coil, and thus only one cooking zone of the cooktop, is energized.

An alternative refinement of the method according to the present invention advantageously provides that the heating coils of the cooking zones of the cooktop be driven simultaneously for purposes of automatic correlation. In this manner, the speed of the automatic correlation is increased because heating coils of different cooking zones of the cooktop are simultaneously driven and thereby energized.

A refinement that synergistically combines the two aforementioned refinements of the method according to the present invention advantageously provides that, for purposes of automatic correlation, the heating coils of the cooking zones of the cooktop be driven simultaneously in a first phase and successively in a second phase. In this manner, on the one hand, the speed of the automatic correlation is increased compared to purely successive driving and, on the other hand, the technical complexity required for automatic correlation is reduced compared to purely simultaneous driving. For example, in the first phase, it may initially be determined on which of the plurality of cooking zones of the cooktop a cooktop utensil is actually placed. In the second phase, it may then be provided to drive only the heating coils that are associated with cooking zones on which a cooktop utensil is placed.

For example, to allow the individual cooking zones to be distinguished from each other for purposes of automatic correlation even if the heating coils of the cooking zones are driven simultaneously, an advantageous refinement of the method according to the present invention provides that the correlation signals (e.g., power profiles) of the heating coils of the individual cooking zones, which correlation signals are generated by way of the respective driving operations, differ from each other. This ensures that the individual heating coils, and thus also the individual cooking zones of the inductively heated cooktop, can be reliably distinguished for purposes of the inventive automatic correlation of the at least one cooktop utensil with the at least one of the plurality of cooking zones. This applies in particular when the heating coils of the cooking zones are driven simultaneously.

It is possible, for example, that the correlation signals, whether or not they are in the form of power profiles, have different signal durations for each of the cooking zones of the plurality of cooking zones. Also, a combination of different features of a correlation signal, such as, for example, rising edges, falling edges, signal duration, maxima and/or minima, may be different for each of the cooking zones of the plurality of cooking zones, and thus may be used for the automatic correlation of the at least one cooktop utensil with a particular cooking zone of the plurality of cooking zones.

The advantage of using different correlation signals, such as different power profiles, for each of the plurality of cooking zones is, in particular, that the heating coils of the plurality of cooking zones can be driven by the cooktop controller nearly without delay or even without any delay; i.e., simultaneously.

However, in particular in the case of flat cooktops, it is possible for a cooktop utensil to be placed not only on one cooking zone, but on a plurality of adjacent cooking zones of the cooktop. This can be taken into account by providing that the different correlation signals (e.g., power profiles) of the plurality of cooking zones differ from each other in such a way that, for purposes of automatic correlation, both the individual correlation signals and the signal components of the response signal which are based on the respective correlation signals can be separated during evaluation in the evaluation unit. In this regard, suitable methods are known to those skilled in the art. This separation may also be performed in an evaluation unit of the at least one cooktop utensil. This then has the advantage that the volume of data to be transmitted by the transmitter unit of the respective cooktop utensil to the receiver unit is reduced. However, for higher levels of complexity, it is advantageous to perform the separation in the cooktop controller or in a third device. The third device may be, for example, a smartphone, a tablet, a computer or a central user interface that is used for controlling multiple kitchen appliances.

An advantageous refinement of the aforementioned embodiment, namely that the correlation signals of the heating coils of the individual cooking zones, which are generated by respective driving operations, differ from each other, provides that the correlation signals of the heating coils of the individual cooking zones, which are generated by the driving thereof, each have encoded therein a different delay time, the transmitter unit of the cooktop utensil placed on a particular cooking zone delaying the transmission of the response signal to the receiver unit as a function of the encoded delay time of the heating coil of this cooking zone. This provides a particularly simple way of distinguishing the correlation signals with which the individual heating coils of the cooking zones are driven by the cooktop controller, and thus also of distinguishing the individual cooking zones. This refinement is especially advantageous when the heating coils of the cooking zones are driven simultaneously. Analogously to the above explanations, the correlation signals take the form of, for example, power profiles.

An advantageous refinement of the last-mentioned embodiment of the method according to the present invention provides that the encoded delay times of the correlation signals generated for driving the heating coils be configurable. For example, the encoded delay times could be configured to allow compensation for the resulting different processing times in a plurality of cooktop utensils placed on cooking zones of the cooktop at the same time. Accordingly, it would be possible for the respective response signals of the individual cooktop utensils to be processed with a uniform offset between the driving of the heating coils of each of the plurality of cooking zones and the reception of the response signals by the receiver unit. Moreover, the aforementioned configuration could, for example, be dynamically adapted to enable shortest possible response times of the cooktop, namely automatic correlation of the at least one cooktop utensil with a particular cooking zone of the plurality of cooking zones within the shortest possible time, in the case of varying constellations of the at least one cooktop utensil placed on the cooktop.

Another advantageous refinement of the method according to the present invention provides that the correlation of the cooktop utensil placed on a particular cooking zone of the plurality of cooking zones with this particular cooking zone be performed in the evaluation unit by way of an overall time lag between the driving of the at least one heating coil associated with this cooking zone with the correlation signal and the reception by the receiver unit of the response signal of the cooktop utensil placed on this cooking zone. This provides an alternative or additional way of automatically correlating the at least one cooktop utensil with a particular cooking zone of the plurality of cooking zones of the cooktop. Accordingly, it is conceivable for the automatic correlation to be performed on the basis of different correlation signals of the heating coils of the individual cooking zones of the cooktop and/or on the basis of overall time lags for every possible pairing of the plurality of cooking zones with the at least one cooktop utensil.

An advantageous refinement of the aforementioned embodiment provides that, for every possible pairing of the plurality of cooking zones with the at least one cooktop utensil, an overall time lag is predetermined and stored in a memory that is in signal communication with the cooktop controller or the third device. In this way, the present invention is implemented in a particularly simple manner. The memory may take the form of, for example, a cloud connected in signal communication with the cooktop controller or the third device. The overall time lags may be stored in the memory as a list or as an algorithm. In comparison with a list, an algorithm is advantageous when a large number of correlations need to be handled in the memory.

An advantageous refinement of the inventive method according to any of the latter two embodiments provides that a partial time lag of the overall time lag, which partial time lag is dependent on a cooktop utensil placed on a particular cooking zone of the plurality of cooking zones, be transmitted from the transmitter unit of this cooktop utensil to the receiver unit by way of the response signal, and that the overall time lag be determined in the evaluation unit by way of the partial time lag. In this way, specific properties of the at least one cooktop utensil, such as, for example, the installed hardware and/or the loaded firmware, which may influence the partial time lag of the overall time lag, which partial time lag is dependent on the particular cooktop utensil, can be taken into account in the determination of the overall time lag. Accordingly, the automatic correlation of the at least one cooktop utensil with a particular cooking zone of the plurality of cooking zones is qualitatively improved.

A particularly advantageous refinement of the latter three embodiments provides that the identification of a particular cooktop utensil of the at least one cooktop utensil be performed by the evaluation unit as a function of the overall time lag for every possible pairing of the plurality of cooking zones with the at least one cooktop utensil, the overall time lag being different for every possible pairing of the plurality of cooking zones with the at least one cooktop utensil. This simplifies the inventive method because the evaluation of the overall time lag in the evaluation unit serves not only to automatically correlate this individual cooktop utensil with a particular cooking zone of the plurality of cooking zones of the cooktop, but also to identify this individual cooktop utensil.

Another advantageous refinement of the method according the present invention provides that the transmitter unit of the cooktop utensil delay the transmission of the response signal to the receiver unit as a function of an individual delay time stored in the transmitter unit. In this manner, even when several cooktop utensils are placed on a common cooking zone of the cooktop, the individual cooktop utensils can be reliably correlated with this cooking zone of the cooktop.

Another advantageous refinement of the method according to the present invention provides for the response signal to be buffered in the transmitter unit. This allows, for example, for orderly transmission in a predetermined sequence when several cooktop utensils are used on the cooktop at the same time. Data loss due to simultaneous transmission by the individual cooktop utensils is thereby reliably prevented.

To allow transmission to be effected temporally independently of an energization of the at least one cooktop utensil by way of the at least one heating coil and the induction coil of the cooktop utensil, an advantageous refinement of the method according to the present invention provides that the operating power coupled by the at least one heating coil of the cooktop into the induction coil of the cooktop utensil that is placed on this cooking zone be at least partially stored for the transmission unit in an energy storage device of the cooktop utensil.

Another advantageous refinement of the method according the present invention provides for the response signal to contain additional information on an operating setting of the cooktop utensil and/or an operating parameter of the cooktop utensil and/or an operating state of the cooktop utensil.

As already explained above, the driving of the heating coils of the cooking zones of the cooktop can be freely selected within wide suitable limits. A particularly advantageous refinement of the method according to the present invention provides that, for purposes of automatic correlation, the heating coils of the cooking zones of the cooktop be driven by the cooktop controller as a function of at least one trigger event that is dependent on the cooktop and/or the cooktop utensil and/or the third device. This allows the heating coils of the cooking zones to be adequately driven according to the particular situation.

For example, it may advantageously be provided for the trigger event to occur continuously as a function of at least one predetermined time interval when the cooktop is on. In this way, automatic correlation of at least one cooktop utensil with at least one cooking zone of the cooktop is reliably ensured during the entire operating time of the cooktop with simple circuitry.

An advantageous refinement of the latter two embodiments of the method according to the present invention provides for the trigger event to occur as a function of at least one change in a correlation of the at least one cooktop utensil with at least one of the cooking zones of the plurality of cooking zones. In this way, the automatic correlation according to the present invention is quantitatively reduced without impairing the overall quality of the automatic correlation.

A further advantageous refinement of the method according to the present invention provides that, in a standby mode of the inductive cooktop, the heating coil not be driven by the cooktop controller and that, in an operating mode of the inductive cooktop, the heating coil be driven to heat a cooktop utensil with the transmitter unit which cooktop utensil is placed on the cooking zone, the inductive cooktop additionally being operated by the cooktop controller in a ready mode, and the inductive cooktop being switched from the standby mode to the ready mode by the wake-up signal received by the receiver unit of the cooktop controller, and, in the ready mode, the heating coil being driven by the cooktop controller in such a way that, on the one hand, the cooktop utensil is prevented from being effectively heated for a preparation operation and that, on the other hand, signal transmission between the transmitter unit and the receiver unit is enabled by means of the heating coil. The provision of a ready mode according to the present invention significantly simplifies user control of the inductive cooktop, and thus the preparation operation on the inductive cooktop, without impairing safety.

An advantageous refinement of the aforementioned embodiment of the method according to the present invention provides that, in the ready mode, the heating coil be driven by the cooktop controller in such a way that transmission of an operating power from the inductive cooktop to the cooktop utensil that is placed on the cooking zone associated with this heating coil is enabled by means of the heating coil. This allows the cooktop utensil to be supplied with the operating power required for the operation thereof by means of the inductive cooktop. Accordingly, the cooktop utensil does not need a power source or needs only a very small and thus space-saving power source.

The wake-up signal for switching the inductive cooktop from its standby mode to its ready mode can, in principle, be freely selected within wide suitable limits. An advantageous refinement of the inventive method provides for the wake-up signal to be generated by actuation of a control element that is provided on the cooktop utensil and is in signal communication with the transmitter unit and/or by a motion sensor that is mounted on the cooktop utensil and is in signal communication with the transmitter unit and/or by actuation of a control element that is provided on the inductive cooktop and is in signal communication with the receiver unit of the cooktop controller and/or by actuation of a control element that is provided on a third device and is in signal communication with the receiver unit of the cooktop controller. This allows the wake-up signal to be triggered by means of the cooktop utensil, for example. A user could press a corresponding button of the cooktop utensil. It is also conceivable that a movement of the cooktop utensil detected, for example, by a motion sensor in the form of an acceleration sensor may be used to trigger the wake-up signal. In addition, the wake-up signal may also be triggered by a third device, such as, for example, a smartphone. Moreover, the triggering of the wake-up signal may also be caused by a user control action on the inductive cooktop, such as by actuation of a button of the inductive cooktop. Accordingly, there is a wide variety of ways of switching the inductive cooktop from its standby mode to the ready mode.

The electric power supply for the heating coil can, in principle, be freely selected within wide suitable limits in terms of type and functioning principle. A further advantageous refinement of the method according to the present invention provides that the electric power with which the cooktop controller drives the heating coil in the ready mode have an average value of less than or equal to 30 W, preferably less than or equal to 15 W. This ensures that the electric power supplied to the heating coil in the ready mode of the inductive cooktop is harmless from a safety standpoint.

Another advantageous refinement of the method according to the present invention provides that the electric power with which the cooktop controller drives the heating coil in the ready mode have a pause/power ratio of greater than or equal to 1000:1. For example, the pause in; i.e., the interruption of, the electric power supply to the heating coil could be 2 s, while the time interval during which the electric power is supplied to the heating coil is 160 μs. Thus, the pause is significantly longer than the time interval for power transmission. Alternatively or in addition to the aforementioned embodiment, it is thereby ensured that the electric power supplied to the heating coil in the ready mode of the inductive cooktop is harmless from a safety standpoint.

A particularly advantageous refinement of the method according to the present invention provides that the automatic correlation of at least one cooktop utensil with at least one cooking zone of the inductive cooktop having a plurality of cooking zones which are inductively heated by at least one respective heating coil be performed in the ready mode.

This makes it possible to determine during the ready mode whether or not a cooktop utensil has been placed on a cooking zone of the inductive cooktop. If the cooktop utensil is placed on the cooking zone, the inductive cooktop can then, for example, be automatically switched from the ready mode to the operating mode, so that the cooktop utensil can be effectively energized by the heating coil associated with this cooking zone for a preparation operation by means of this cooktop utensil. Otherwise; i.e., if no correlation is established between a cooktop utensil and a cooking zone of the inductive cooktop, then the inductive cooktop remains in the ready mode.

A particularly advantageous refinement of the method provides that the inductive cooktop be automatically switched from the ready mode to the operating mode by means of the cooktop controller and as a function of the response signal received by the receiver unit in the ready mode. In this way, the ease of use of the inductive cooktop according to the present invention is further increased without impairing safety during user operation of the inductive cooktop.

Another advantageous refinement of the method according to the present invention provides that the inductive cooktop additionally be operated in a demonstration mode by means of the cooktop controller, the inductive cooktop being switched to the demonstration mode by a switchover signal received by the receiver unit of the cooktop controller, and the demonstration mode substantially corresponding to the ready mode, except that automatic switching from the demonstration mode to the operating mode is not possible. This makes it possible to use the functionality of the inductive cooktop in its ready mode for demonstration purposes, for example at trade shows, without the risk of the inductive cooktop being unintentionally switched to the operating mode. Accordingly, safety is fully ensured also in the demonstration mode of the inductive cooktop.

A further advantageous refinement of the method according to the present invention provides that the driving of the heating coil be performed as a function of a placement event detected by a sensor or of an underlying surface on which the cooktop utensil has been placed and which is detected by the sensor. The advantage provided by this is, in particular, that the operation of a system including an inductive cooktop and a cooktop utensil is thereby improved. For example, the ease of use is increased for a user of such systems. Due to the automatic detection of a placement event or of a placement event and the nature of an underlying surface on which the cooktop utensil has been placed, it is possible to simplify the handling of the inventive cooktop utensil and of the inventive system. For example, this allows an intervention by the user to be automatically detected and used for the subsequent control of the system. Furthermore, subsequent steps in the preparation of a medium present in the cooktop utensil may be anticipated by the inductive cooktop to thereby simplify the further preparation process. The present invention also makes it possible, for example, to protect the inductive cooktop from being misused, thereby effectively preventing possible damage to the inductive cooktop as well as situations that may pose a safety hazard. The present invention further makes it possible to reduce the energy consumption of the cooktop utensil and of the inductive cooktop. This may be achieved, for example, by providing that signal transmission between the cooktop utensil and the cooktop controller of the inductive cooktop occurs only when the sensor detects a placement event or a placement event and the nature of an underlying surface on which the cooktop utensil has been placed. The term "cooktop utensil" is intended herein to have a wide meaning and to include, in particular, any conceivable type of cookware, such as, for example, pots and pans.

In principle, it is conceivable that the driving of the heating coil as a function of a placement event detected by the sensor or of an underlying surface on which the cooktop utensil has been placed and which is detected by the sensor may be performed such that the heating coil is, for example, directly energized with an electric power sufficient for a preparation operation. It is also conceivable that when the sensor detects placement of the cooktop utensil on a cooking zone of the inductive cooktop and excessive swirling of the cooktop utensil, the supply of electric power is automatically reduced, for example, to protect components of a resonant circuit of the cooktop from damage.

An advantageous refinement of the inventive method provides that a processing routine for automatically correlating the cooktop utensil with at least one cooking zone of the inductive cooktop be started as a function of a placement event detected by the sensor or of an underlying surface on which the cooktop utensil has been placed and which is detected by the sensor. This makes it possible, for example, to initially drive the heating coil with a reduced electric power which is, in fact, sufficient to automatically correlate the cooktop utensil with at least one cooking zone of the inductive cooktop, but does not cause effective heating for a preparation operation. This may be achieved, for example, by way of a suitable pause/power ratio. The heating coil is not energized with an electric power sufficient for a preparation operation until the processing routine establishes an automatic correlation of the cooktop utensil to the cooking zone that corresponds to the aforementioned heating coil. Accordingly, safety is further increased.

The processing routine for automatically correlating the cooktop utensil with at least one cooking zone of the inductive cooktop can be freely selected within wide suitable limits. An advantageous refinement of the aforementioned embodiment of the method according to the present invention provides that output signals of the sensor be used in the processing routine for automatically correlating the cooktop utensil with at least one cooking zone of the inductive cooktop. For example, vibrations of the cooktop utensil detected by the sensor could be analyzed in the processing routine to thereby achieve the above-mentioned correlation.

An advantageous refinement of the method according to the present invention provides that information be output to the user by the cooktop utensil output unit and/or by the cooktop output unit as a function of a placement event detected by the sensor or of an underlying surface on which the cooktop utensil has been placed and which is detected by the sensor. This makes it possible to give the user of the cooktop utensil feedback about, for example, the presence of a placement event or the nature of the underlying surface. It is conceivable, for example, that in the case of a cooktop utensil having residual heat, information in the form of a warning signal may be output if the sensor detects that the underlying surface on which the cooktop utensil has been placed is not a cooking zone of the inductive cooktop, but a surface made of wood or fabric material.

An advantageous refinement of the method according to the present invention provides that a fill volume in the cooktop utensil and/or a condition of the medium that is relevant for the preparation of the medium be detected as a function of output signals of the sensor. In this way, the functionality of the sensor is further enhanced. For example, alternatively or in addition to the fill volume of the medium in the cooktop utensil, it could be detected whether the medium has reached its boiling point. It is also conceivable to determine the boiling appearance of the medium; i.e., the boiling behavior of the medium, in particular in relation to the supplied heating power.

Furthermore, the method according to the present invention may be used to prevent noise emission during the preparation operation. This may be achieved, for example, by adjusting an operating frequency of the heating coil as a function of output signals of the sensor so as to prevent the occurrence of resonance in the individual cooktop utensil.

An advantageous refinement of the method according to the present invention provides that the evaluation of output signals of the sensor be performed in the cooktop utensil. This eliminates the need for the output signals of the sensor to be transmitted continuously or at least at regular intervals from the cooktop utensil to the cooktop controller or a third device. However, the evaluation of the output signals of sensor may also at least partially be performed in the cooktop controller and/or in a third device that is in signal communication with the cooktop controller.

The inductive cooktop according to the present invention includes at least one cooking zone, at least one heating coil associated with the cooking zone, and a cooktop controller for driving the heating coil in an operating mode of the inductive cooktop to heat a cooktop utensil with a transmitter unit which cooktop utensil is placed on the cooking zone, the cooktop controller being configured and adapted such that the inductive cooktop can additionally be operated in a standby mode, driving of the heating coil being disabled in the standby mode, characterized in that the cooktop controller is configured and adapted such that the inductive cooktop can additionally be operated in a ready mode, the inductive cooktop being switchable from the standby mode to the ready mode by a wake-up signal received by a receiver unit of the cooktop controller, and, in the ready mode, the heating coil being drivable by the cooktop controller in such a way that, on the one hand, the cooktop utensil is prevented from being effectively heated for a preparation operation and that, on the other hand, signal transmission between the transmitter unit and the receiver unit is enabled by means of the heating coil. As already explained above, the provision of a ready mode significantly simplifies user control of the inductive cooktop according to the present invention, and thus the preparation operation on the inductive cooktop, without impairing safety.

An advantageous refinement of the inductive cooktop according to the present invention provides that, in the ready mode, the heating coil be drivable by the cooktop controller in such a way that transmission of an operating power from the inductive cooktop to the cooktop utensil placed on the cooking zone associated with this heating coil is enabled by means of the heating coil. As already explained above, this allows the cooktop utensil to be supplied with the operating power required for the operation thereof by means of the inductive cooktop. Accordingly, the cooktop utensil does not need a power source or needs only a very small and thus space-saving power source.

A particularly advantageous refinement of the inductive cooktop according to the present invention provides that the inductive cooktop be automatically switchable from the ready mode to the operating mode by means of the cooktop controller and as a function of a response signal received by the receiver unit in the ready mode. In this way, the ease of use of the inductive cooktop according to the present invention is further increased without impairing safety during user operation of the inductive cooktop.

The inventive cooktop utensil for an inductive cooktop includes an induction coil inductively couplable with a heating coil of the inductive cooktop and a transmitter unit, characterized in that the cooktop utensil has at least one sensor for detecting a placement event or for detecting a placement event and for detecting the nature of an underlying surface on which the cooktop utensil has been placed Due to the automatic detection of a placement event or of a placement event and the nature of an underlying surface on which the cooktop utensil has been placed, it is possible to simplify the handling of the cooktop utensil according to the present invention as well as of the system according to the present invention. For example, this allows an intervention by the user to be automatically detected and used for the subsequent control of the system. Furthermore, subsequent steps in the preparation of a medium present in the cooktop utensil may be anticipated by the inductive cooktop to thereby simplify the further preparation process. The present invention also makes it possible, for example, to protect the inductive cooktop from being misused, thereby effectively preventing possible damage to the inductive cooktop as well as situations that may pose a safety hazard. The present invention further makes it possible to reduce the energy consumption of the cooktop utensil and of the inductive cooktop. This may be achieved, for example, by providing that signal transmission between the cooktop utensil and the cooktop controller of the inductive cooktop occurs only when the sensor detects a placement event or a placement event and the nature of an underlying surface on which the cooktop utensil has been placed. The term "cooktop utensil" is intended herein to have a wide meaning and to include, in particular, any conceivable type of cookware, such as, for example, pots and pans.

The cooktop utensil can be selected within wide suitable limits in terms of type, material, and dimensions. This also applies to the sensor of the cooktop utensil. An advantageous refinement of the cooktop utensil according to the present invention provides that the sensor take the form of a vibration sensor and/or an acceleration sensor. In this way, the sensor is implemented in a simple yet reliable manner. This also allows subsequent steps in the preparation of a medium present in the cooktop utensil to be better anticipated by the inductive cooktop to thereby further simplify the further preparation process. Moreover, the present invention according to this refinement better protects the inductive cooktop from being misused, thereby even more effectively preventing possible damage to the inductive cooktop as well as situations that may pose a safety hazard.

Expediently, it is provided for the at least one sensor to be mounted on a handle of the cooktop utensil and/or on a receptacle of the cooktop utensil for receiving a medium intended for preparation by means of the cooktop utensil. Mounting the sensor on the handle of the cooktop utensil has, for example, the advantage that the sensor is disposed in a thermally insulated region. Mounting the sensor on the receptacle of the cooktop utensil in turn has the advantage that the sensor is disposed closer to the location where forces are introduced when the cooktop utensil is placed on the underlying surface, such as on a cooking zone of the inductive cooktop.

A further advantageous refinement of the cooktop utensil according to the present invention provides that the cooktop utensil additionally have a control element for manual control by the user, the functionality of the sensor at least partially overlapping with the functionality of the control element. This provides redundancy for the sensor. Furthermore, it is conceivable, for example, that the control element may serve to turn off the cooktop utensil.

Another advantageous refinement of the cooktop utensil according to the present invention provides that the cooktop utensil be configured and adapted such that the transmitter unit and/or the sensor can be supplied with an operating power by way of the induction coil. Thus, only a small and thus space-saving energy storage device may be sufficient for storing the operating power for the cooktop utensil.

Accordingly, an advantageous refinement of the system according to the present invention provides that the transmitter unit and/or the measurement unit and/or the sensor be suppliable with an operating power when a voltage is induced by the heating coil into the induction coil of the cooktop utensil that is placed on the cooking zone associated with this heating coil.

Furthermore, an advantageous refinement of the cooktop utensil according to the present invention provides that the cooktop utensil have a cooktop utensil output unit for outputting information to the user of the cooktop utensil, an information item being outputtable to the user by the cooktop utensil output unit as a function of a placement event detected by the sensor or of an underlying surface on which the cooktop utensil has been placed and which is detected by the sensor. This makes it possible to give the user of the cooktop utensil feedback about, for example, the presence of a placement event or the nature of the underlying surface. It is conceivable, for example, that in the case of a cooktop utensil having residual heat, information in the form of a warning signal may be output if the sensor detects that the underlying surface on which the cooktop utensil has been placed is not a cooking zone of the inductive cooktop, but a surface made of wood or fabric material.

The inventive system including the inductively heated cooktop and the at least one cooktop utensil can be selected within wide suitable limits in terms of type, function, dimensions, material, configuration and number of individual system components. This holds particularly for the at least one cooktop utensil.

A particularly advantageous refinement of the system according to the present invention provides that the cooktop utensil take the form of a cookware item. In this way, the cooktop utensil is implemented in a particularly simple manner. Moreover, the cooktop utensil may not only perform the function of automatic correlation thereof with at least one of the plurality of cooking zones of the cooktop, but also the function of a cookware item. In this way, the inventive system is simplified and reduced in components, and therefore is less expensive to manufacture. The cookware item can be selected within wide suitable limits in terms of type, function, dimensions, material, and configuration. For example, the cookware item may take the form of a pot, a pan, a roaster or a kettle. This list is not exhaustive, but merely exemplary.

An advantageous refinement of the inventive system, which is an alternative to the aforementioned embodiment, provides that the cooktop utensil take the form of an adapter for a cookware item. This provides a clear functional separation between the function of automatically correlating the cooktop utensil with at least one of the plurality of cooking zones of the cooktop, one the one hand, and the function of the cookware item on the other hand. Accordingly, both the at least one cooktop utensil and the at least one cookware item can be specifically designed for the respective function. Moreover, by using a cooktop utensil that is separate from a cookware item, this cooktop utensil can be used for different cookware items.

Furthermore, an advantageous refinement of the aforementioned embodiment of the inventive system provides that the transmitter unit and/or the sensor be suppliable with an operating power when a voltage is induced by the heating coil into the induction coil of the cooktop utensil that is placed on the cooking zone associated with this heating coil.

Moreover, an advantageous refinement of the inventive system according to any of the latter two embodiments provides that the inductive cooktop have a cooktop output unit for outputting information to the user of the cooktop utensil, an information item being outputtable to the user by the cooktop output unit as a function of a placement event detected by the sensor or of an underlying surface on which the cooktop utensil has been placed and which is detected by the sensor. Analogously to the above-mentioned cooktop utensil output unit according to one of the aforementioned embodiments, this makes it possible to give the user of the cooktop utensil feedback about, for example, the presence of a placement event or the nature of the underlying surface. It is conceivable, for example, that in the case of a cooktop utensil having residual heat, information in the form of a warning signal may be output if the sensor detects that the underlying surface on which the cooktop utensil has been placed is not a cooking zone of the inductive cooktop, but a surface made of wood or fabric material.

In FIG. 1, an exemplary embodiment of an inventive system 2 for carrying out a method according to the present invention is shown very schematically by way of example. System 2 has an inductive cooktop 4 including a total of four cooking zones 6. In a manner known to those skilled in the art, each of the cooking zones 6 has associated therewith a heating coil 8 for inductively heating a cookware item placed on the respective cooking zone 6. Cooktop 4 has a cooktop controller 10 for driving the individual heating coils 8. Cooktop controller 10 drives each of the individual heating coils 8 with an individual correlation signal. The respective correlation signals take the form of power profiles. The power profiles are not necessarily designed for the heating of the cooking zones, and thus of cooktop utensils placed on the cooking zones, but may also be designed merely for the automatic correlation function.

Thus, inductive cooktop 4 includes least one cooking zone 6, at least one heating coil 8 associated with cooking zone 6, and a cooktop controller 10 for driving heating coil 8 in an operating mode E of inductive cooktop 4 to heat a cooktop utensil 12 with a transmitter unit 16 which cooktop utensil is placed on cooking zone 6. Cooktop controller 10 is configured and adapted such that inductive cooktop 4 can additionally be operated in a standby mode S, driving of the respective heating coil 8 being disabled in standby mode S. Furthermore, cooktop controller 10 is configured and adapted such that inductive cooktop 4 can additionally be operated in a ready mode B, inductive cooktop 4 being switchable from standby mode S to ready mode B by a wake-up signal received by a receiver unit 18 of cooktop controller 10. In ready mode B, the respective heating coil 8 is drivable by cooktop controller 10 in such a way that, on the one hand, cooktop utensil 12 is prevented from being effectively heated for a preparation operation and that, on the other hand, signal transmission between transmitter unit 16 and receiver unit 18 is enabled by means of heating coil 8.

Moreover, the present exemplary embodiment provides that, in ready mode B, heating coil 8 be drivable by cooktop controller 10 in such a way that transmission of an operating power from inductive cooktop 4 to the cooktop utensil 12 placed on the cooking zone 6 associated with this heating coil 8 is enabled by means of heating coil 8.

Inductive cooktop 4 is automatically switchable from ready mode B to operating mode E by means of cooktop controller 10 and as a function of a response signal received by receiver unit 18 in ready mode B.

When inductive cooktop 4 is in ready mode B, cooktop controller 10 drives each of the individual heating coils 8 with an individual correlation signal. As already explained above, the respective correlation signals take the form of power profiles.

Transmitter unit 16 takes the form of a Bluetooth transmitter and, as already described above, is supplied with an operating power required for transmission by a voltage induced into induction coil 14. To this end, transmitter unit 16 is connected in energy transfer relation with induction coil 14. The response signal transmitted by transmitter unit 16 may be received by receiver unit 18 of cooktop controller 10. The response signal is indicated by a flash symbol 20 in FIG. 1. The response signal 20 received by receiver unit 18 is comparable by an evaluation unit 22 of cooktop controller 10 to power profiles associated with the individual heating coils 8.

Figure 7:
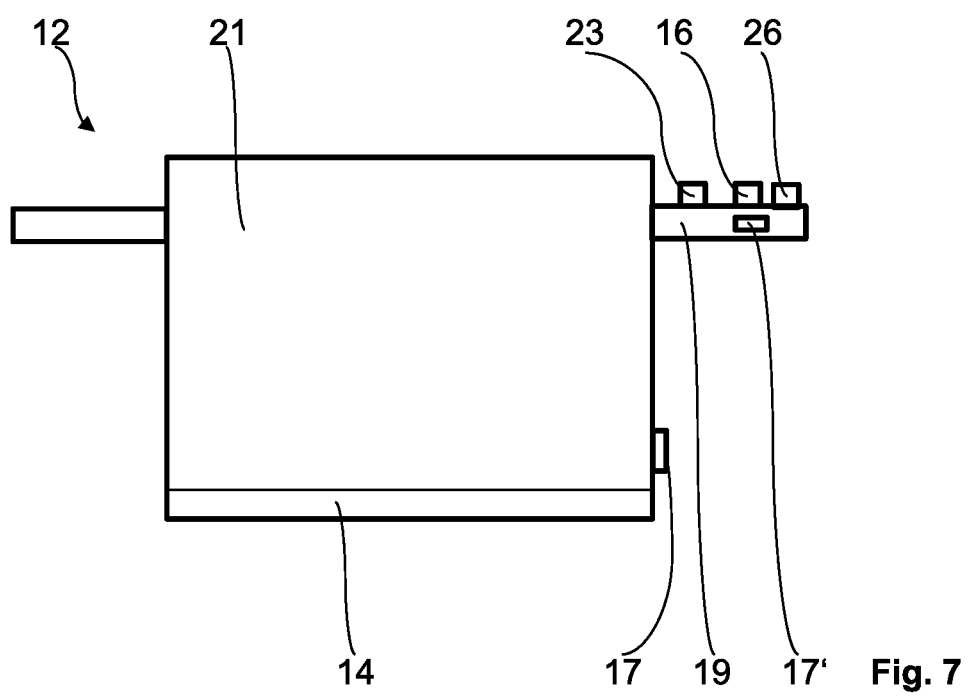
FIG. 7 shows an exemplary embodiment of the inventive cooktop utensil of the system of FIG. 1.

Cooktop utensil 12 further includes a sensor 17 for detecting a placement event and for detecting the nature of an underlying surface on which cooktop 12 utensil has been placed. In this regard, see FIG. 7. In a simpler embodiment, the sensor may be designed merely for detecting a placement event.

Sensor 17 takes the form of an acceleration sensor, vibrations also being detectable by the acceleration sensor. In a first variant, sensor 17 is mounted on a handle 19 of cooktop utensil 12 and, in a second variant, on a receptacle 21 of cooktop utensil 12 for receiving a medium intended for to be prepared using cooktop utensil 12. The two variants for the positioning of sensor 17 on cooktop utensil 12 are denoted by reference numerals 17 and 17' in FIG. 7. For the sake of simplicity, only reference numeral 17 will be used hereinafter, but will always be understood to encompass both of the aforementioned variants of positioning sensor 17, 17'. Cooktop utensil 12 additionally has a control element 23 in the form of a control button for manual control by a user. In the present exemplary embodiment, control element 23 is designed to turn off cooktop utensil 12. Furthermore, the functionality of sensor 17 at least partially overlaps with the functionality of control element 23. This will be explained in greater detail below. Cooktop utensil 16 is configured and adapted such that transmitter unit 16 and/or sensor 17 can be supplied with an operating power by way of induction coil 14.

Cooktop utensil 12 also has a cooktop utensil output unit 26 for outputting information to the user of cooktop utensil 12, an information item being outputtable to the user by cooktop utensil output unit 26 as a function of a placement event detected by sensor 17 or of an underlying surface on which cooktop utensil 12 has been placed and which is detected by sensor 17.

In another embodiment of the inventive system, the inductive cooktop may alternatively or additionally have a cooktop output unit for outputting information to the user of the cooktop utensil, an information item being outputtable to the user by the cooktop output unit as a function of a placement event detected by the sensor or of an underlying surface on which the cooktop utensil has been placed and which is detected by the sensor.

In the following, the inventive method will be described in more detail in accordance with the present exemplary embodiment of system 2 with reference to FIGS. 1 through 7.

In FIGS. 2 through 5, three exemplary embodiments of the inventive method are exemplarily illustrated in a respective time/signal diagram.

The inventive method for automatically correlating cooktop utensil 12, which takes the form of a pot, with at least one of the cooking zones 6 of inductive cooktop 4 basically works as follows:

A user of system 2 turns cooktop 4 on and places the cooktop utensil 12 in the form of a pot on the front right cooking zone 6 of cooktop 4, as viewed in the plane of FIG. 1. In the first exemplary embodiment of the inventive method, shown in FIG. 2, cooktop 4 is turned on at a time t=0 s, which is symbolized by an arrow 4 in FIG. 2, whereupon cooktop controller 10 drives the heating coils 8 of the individual cooking zones 6 one after another; i.e., successively, with the respective power profiles thereof. This is symbolized in FIG. 2 by lines a, b, c and d. Line a symbolizes the driving of the heating coil 8 that corresponds to the cooking zone 6 shown bottom left in the plane of FIG. 1, line b symbolizes the driving of the heating coil 8 that corresponds to the cooking zone 6 shown bottom right in the plane of FIG. 1, line c symbolizes the driving of the heating coil 8 that corresponds to the cooking zone 6 shown top right in the plane of FIG. 1, and line d symbolizes the driving of the heating coil 8 that corresponds to the cooking zone 6 shown top left in the plane of FIG. 1.

Since cooktop utensil 12 is placed on the cooking zone 6 shown bottom right in the plane of FIG. 1, the heating coil 8 associated with this cooking zone 6 induces a voltage in induction coil 14 of cooktop utensil 12 when this heating coil 8 is driven. In this regard, see line b in FIG. 2. Due to the voltage induced in induction coil 14, transmitter unit 16 of cooktop utensil 12 is supplied with the operating power required for transmission. Moreover, the induced voltage at the same time triggers transmitter unit 16 to effect a transmission, namely the transmission of response signal 20. See FIG. 2. Response signal 20 includes, on the one hand, an identification identifying cooktop utensil 12 as exactly this individual cooktop utensil 12. This identification of cooktop utensil 12 may, for example, include properties of the pot which are important for a cooking operation on cooking zone 4. On the other hand, response signal 20 includes at least one parameter that correlates with the power profile induced by heating coil 8 into induction coil 14 of the cooktop utensil 12 shown bottom right in the plane of FIG. 1. This parameter may, for example, be the power profile itself. However, it is also conceivable for this parameter to be an electrical parameter and/or a magnetic parameter that characterizes the power profile.

Response signal 20 is transmitted to receiver unit 18 of cooktop controller 10. The response signal 20 received by receiver unit 18 is then transmitted, in a manner known to those skilled in the art, to evaluation unit 22 of cooktop controller 10, which is connected in signal communication with receiver unit 18. In evaluation unit 22, response signal 20 is, inter alia, compared to the power profile of the heating coil 8 that is associated with the cooking zone 6 on which cooktop utensil 12 is placed, shown bottom right in the plane of FIG. 1, with which power profile this heating coil 8 has been driven by cooktop controller 10. Since the at least one parameter that correlates with this power profile and has been transmitted with response signal 20 from cooktop utensil 12 to cooktop controller 10 matches this power profile, cooktop utensil 12 is automatically correlated by evaluation unit 22 of cooktop controller 10 with the cooking zone 6 shown bottom right in the plane of FIG. 1. Cooktop controller 10 now knows that exactly this cooktop utensil 12 is placed on this cooking zone 6 and, based on this, may control the cooking operation for this cooktop utensil 12 by driving the heating coil 8 associated with this cooking zone 6. In evaluation unit 22, response signal 20 is also compared to the power profiles of the other heating coils 8 which are associated with the further cooking zones 6 shown in FIG. 1, with which power profiles these heating coils 8 have been driven by cooktop controller 10. However, since cooktop utensil 12 is not placed on these cooking zones 6, and thus not above the heating coils 8 associated with these cooking zones 6, the respective driving of these heating coils does not result in a response signal corresponding to any of these power profiles.

Figure 2:
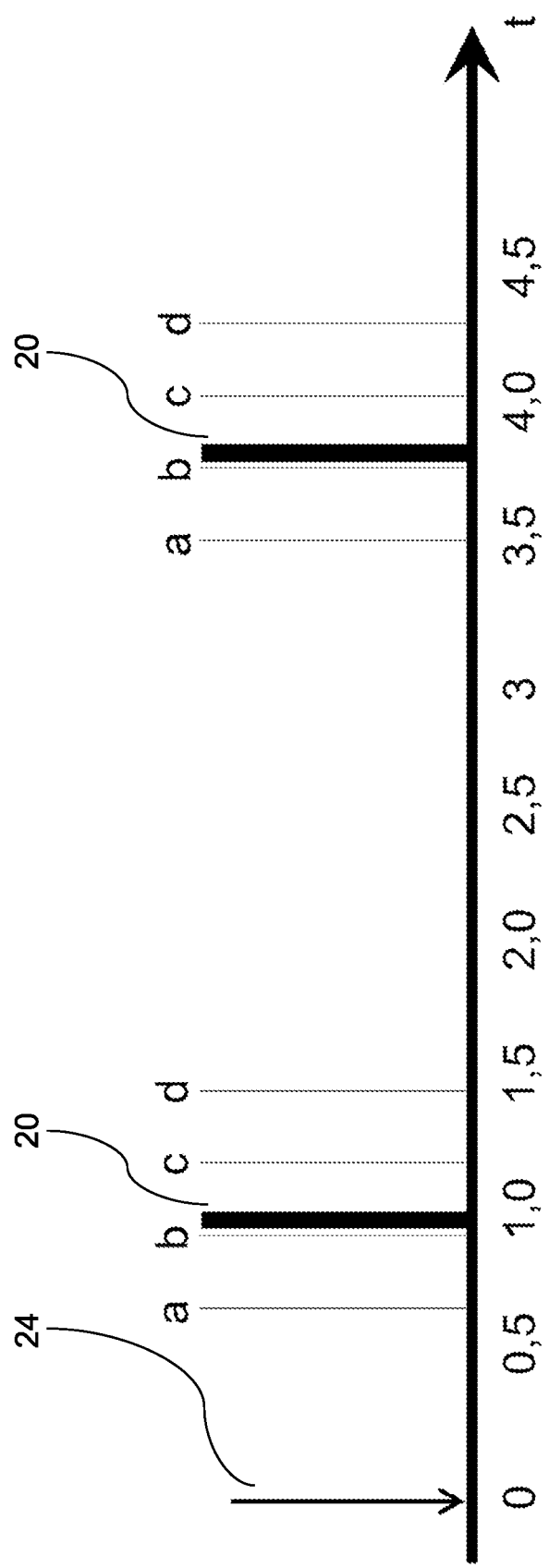
FIG. 2 shows a first exemplary embodiment of a method according to the present invention.

As can further be seen from FIG. 2, driving of the other heating coils 8 of cooktop 4 does not result in response signals from any other cooktop utensils that might be present. In the present exemplary embodiment of the inventive method, the individual heating coils 8 of cooktop 4 are continuously successively driven at predetermined time intervals during the operation of cooktop 4. During each cycle in which the individual heating coils 8 are driven by cooktop controller 10, all of the four heating coils 8 of cooktop 4 are successively driven. After the cycle shown to the left in FIG. 2, a new cycle of successively driving heating coils 8 of cooktop 4 begins at t=3, 5. Thus, in the present exemplary embodiment, the trigger event for driving the individual heating coils 8 of cooktop 4 with their respective power profiles occurs continuously as a function of at least one predetermined time interval when cooktop 4 is on.

Figure 3:
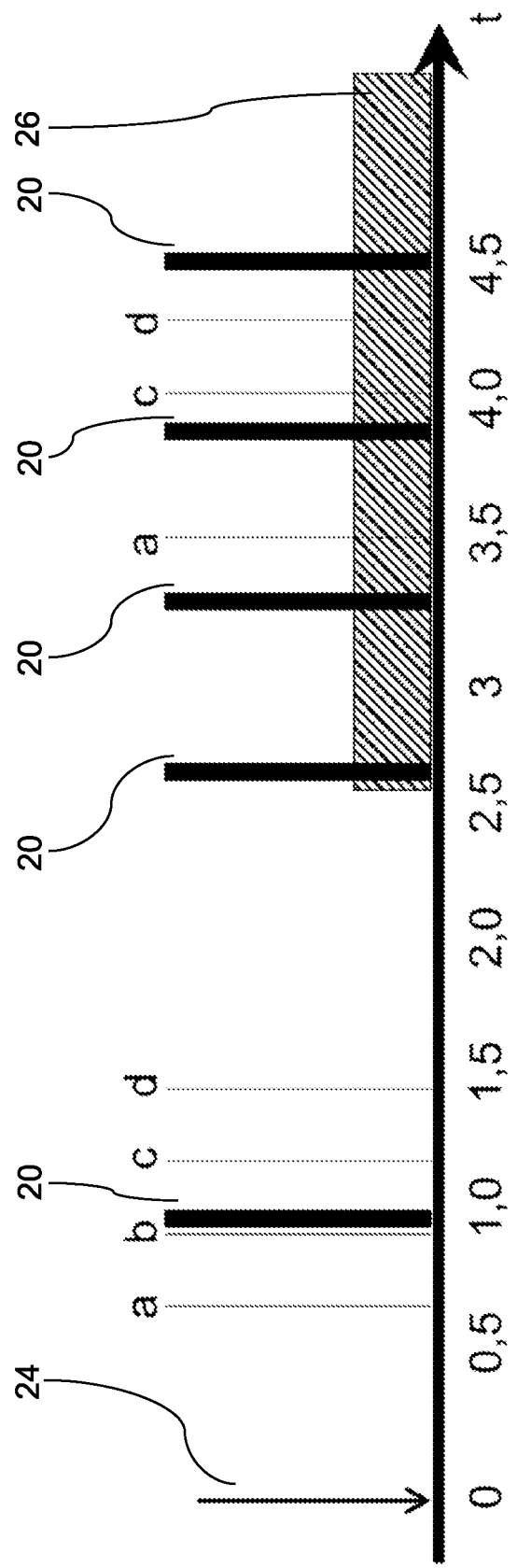
FIG. 3 shows a second exemplary embodiment of a method according to the present invention.

FIG. 3 shows a second exemplary embodiment of the method according to the present invention. In the present exemplary embodiment, unlike the first exemplary embodiment according to FIG. 2, not all of the heating coils 8 are successively driven in each driving cycle in which the individual heating coils 8 are driven by cooktop controller 10. Analogously to the first exemplary embodiment, cooktop utensil 12 is here also placed on the cooking zone 6 shown bottom right in the plane of FIG. 1. As can be seen from FIG. 3, the heating coil 8 associated with this cooking zone 6 is energized; i.e., driven by cooktop controller 10, with a constant power for heating cooktop utensil 12. In this regard, see rectangle 26, which symbolizes the power constantly supplied to cooktop utensil 12 by this heating coil 8. Due to this power constantly supplied to cooktop utensil 12, induction coil 14 of cooktop utensil 12 supplies the transmitter unit 16 embodied as a Bluetooth transmitter continuously with the operating power required by transmitter unit 12 for transmission. Accordingly, transmitter unit 16 of cooktop utensil 12 continuously transmits a response signal 20 to cooktop controller 10 at predetermined time intervals. See FIG. 3. Response signal 20 may be the original response signal 20. However, this is not absolutely necessary. For example, the response signal 20 transmitted during this period of time may be characteristic of the constant power 26 supplied to cooktop utensil 12 for heating during the cooking operation.

Due to the unchanged occupancy of the cooking zone 6 shown bottom right in the plane of FIG. 1 with cooktop utensil 12, only the other heating coils 8 of cooktop 4 are driven with their respective power profiles in the above-described manner, namely successively at predetermined time intervals, during the period of time in which cooktop utensil 12 continuously transmits a response signal 20 to cooktop controller 10. In this regard, see the cycle with the lines a, c and d, shown to the right in the plane of FIG. 3.

Figure 4:
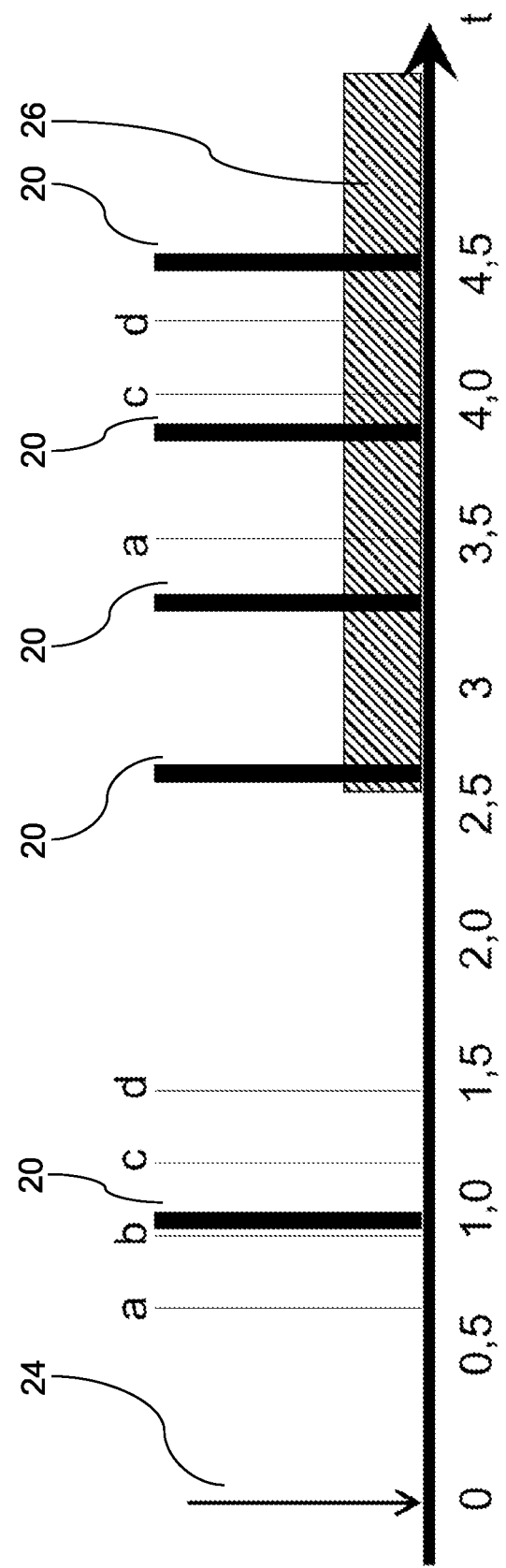
FIGS. 4 and 5 show a third exemplary embodiment of a method according to the present invention.
Figure 5:
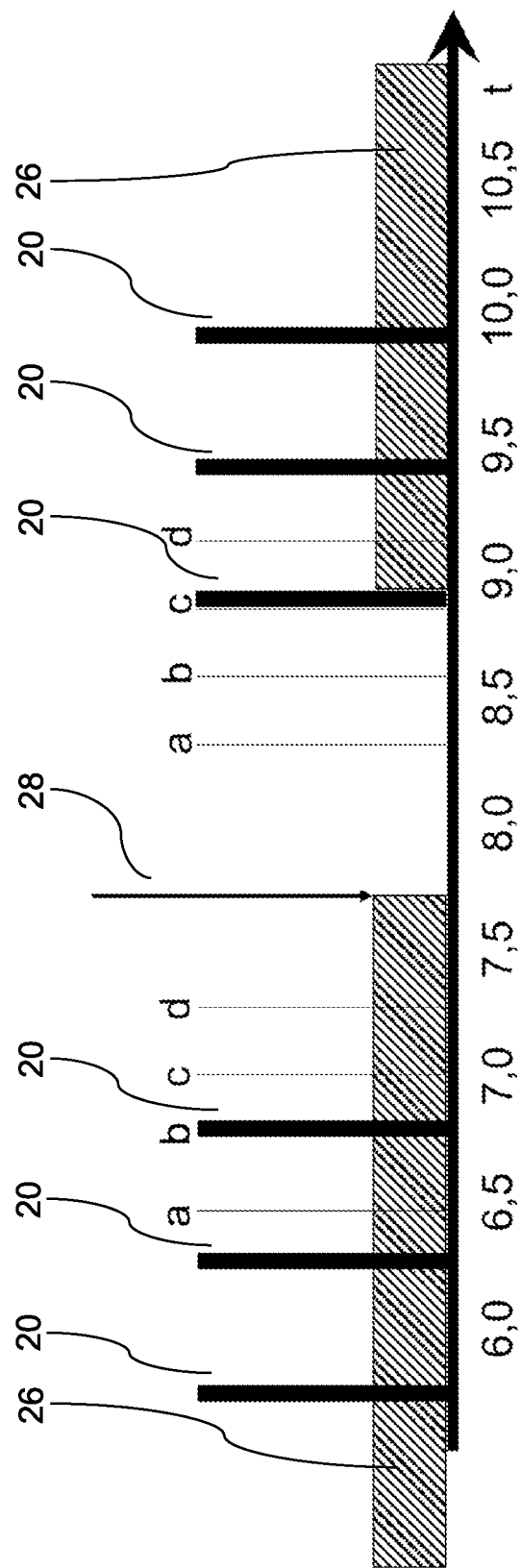
Figure 6:
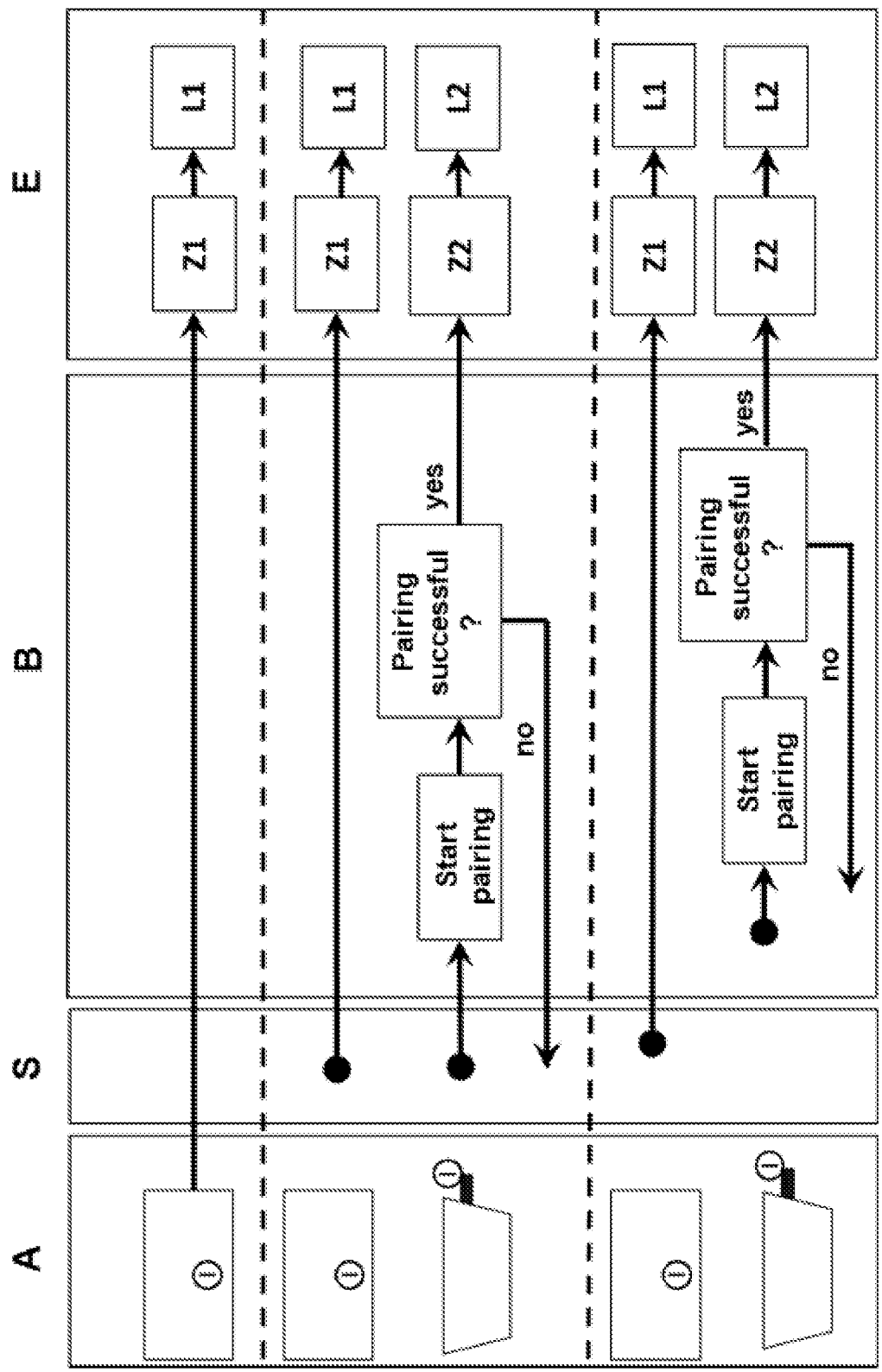
FIG. 6 shows a diagram illustrating different modes of operation of the inventive inductive cooktop of the system of FIG. 1.

FIGS. 4 and 5 together show a fourth exemplary embodiment of the inventive method. FIG. 4 reveals that in the fourth exemplary embodiment, during an initial phase, the sequence and course of the process are initially identical to the sequence and course of the process in the second exemplary embodiment shown in FIG. 3. After a certain period of time, cooktop utensil 12 is moved by the user from the cooking zone 6 shown bottom right in the plane of FIG. 1 to the cooking zone 6 shown top right in the plane of FIG. 1. This is symbolized in FIG. 5 by an arrow 28. This displacement of cooktop utensil 12 is detected by cooktop controller 10, for example, based on a response of the resonant circuit formed by the heating coil 8 of the cooking zone 6 shown bottom right in the plane of FIG. 1 and induction coil 14 of cooktop utensil 12. Due to this detected change in the occupancy of cooking zones 6 of cooktop 4 with cooktop utensil 12, now all of the heating coils 8 of cooktop 4 are driven by cooktop controller 10 for purposes of automatic correlation again, as was the case at the beginning. In this regard, see the driving cycle of heating coils 8 with the lines a, b, c and d that is shown to the right in FIG. 5 in conjunction with the driving cycle of heating coils 8 with the lines a, b, c and d that is shown to the left in FIG. 4. The above displacement of cooktop utensil 12, which has been detected by cooktop controller 10, is a trigger event as a function of which heating coils 8 of cooktop 4 are driven by cooktop controller 10 for purposes of automatic correlation. Analogously to the above explanations in accordance with the first and second exemplary embodiments, in the driving cycle of heating coils 8 that is shown to the right in FIG. 5, cooktop controller 10 detects that cooktop utensil 12, after it has been displaced, is placed on the cooking zone 6 of cooktop 4 that is shown top right in the plane of FIG. 1. Accordingly, now this cooking zone 6 of cooktop 4 is inductively heated in order to heat the cooktop utensil 12 placed thereon. In connection with the heating of cooktop utensil 12 by the cooking zone 6 that is shown top right in the plane of FIG. 1, it may be provided that for this continued heating of cooktop utensil 12, whose heating has already begun on the cooking zone 6 shown bottom right in the plane of FIG. 1, this heating of cooktop utensil 12 that has taken place until the time of the displacement 28 of cooktop utensil 12 be taken into account in the now continued heating of this cooktop utensil 12. This may be achieved, for example, by the cooktop controller 10 of cooktop 4 automatically adjusting the heating duration for this continued heating as a function of the heating of cooktop utensil 12 that has already taken place.

If inductive cooktop 4 is in its OFF mode A, for example because inductive cooktop 4 has been completely turned off using a main switch, the user may switch inductive cooktop 4 of system 2 directly from OFF mode A to operating mode E, for example by acting on inductive cooktop 4 in a manner known in the art. In this regard, see FIG. 6, topmost row. The user can then perform a preparation operation, such as a cooking operation, using system 2 in a manner known to those skilled in the art. To this end, the user can select on inductive cooktop 4, for example by way of a number string Z1 displayed on inductive cooktop 4, a power setting L1 for the heating coil 8 that is associated with the cooking zone 6 on which this cooktop utensil 12, embodied as a pot, is placed.

If inductive cooktop 4 is in its standby mode S, in which inductive cooktop 4 is not completely turned off, driving of the heating coils 8 is technically not possible. To make this possible, the user would first have to switch inductive cooktop 4 to operating mode E, for example in the above-described manner. See FIG. 6, middle row, at top.

However, inductive cooktop 4 of system 2 is configured and adapted to be automatically switched from standby mode S to ready mode B. This requires the above-mentioned wake-up signal, which is received by receiver unit 18 of cooktop controller 10. This wake-up signal can be generated in different ways. In the present exemplary embodiment, it is provided that the wake-up signal be generated by actuation of the control element 23 that is provided on cooktop utensil 12 and is in signal communication with transmitter unit 16 or by the sensor 17 that is mounted on cooktop utensil 12 and is in signal communication with transmitter unit 16 or by actuation of a control element that is provided on inductive cooktop 4 and is in signal communication with receiver unit 18 of cooktop controller 18 or by actuation of a control element that is provided on a third device and is in signal communication with receiver unit 18 of cooktop controller 10. See FIG. 7. Accordingly, inductive cooktop 4 can be switched from standby mode S to ready mode B in very different ways, which increases the ease of use of system 2. The control element of inductive cooktop 4 and the third device embodied as a smartphone are not shown.

For example, the wake-up signal is generated by actuation of the control element 23 of cooktop utensil 12 that is provided on cooktop utensil 12 and is in signal communication with transmitter unit 16. To this end, the user presses control element 23 of cooktop utensil 12, which is embodied as a button, and places cooktop utensil 1 on the above-mentioned cooking zone 6 of inductive cooktop 4. This pressing of the button is evaluated and converted into the wake-up signal by transmitter unit 16 of cooktop utensil 12. The wake-up signal is then transmitted to cooktop controller 10 by means of transmitter unit 16, heating coil 8 and receiver unit 18. Cooktop controller 10 then switches inductive cooktop 4 from standby mode S to ready mode B. Transmitter unit 16 is supplied with operating power by the voltage that is induced by heating coil 8 into the induction coil 14 of the cooktop utensil 12 that is placed on the cooking zone 6 associated with this heating coil 8. See FIG. 6, middle row, at bottom.

In addition, it is provided for the wake-up signal to be automatically generatable by the sensor 17 that is mounted on cooktop utensil 12 and is in signal communication with transmitter unit 16. For example, sensor 17 automatically detects that cooktop utensil 12 has been placed by the user on the aforementioned cooking zone 6 of inductive cooktop 4. Thus, sensor 17 has detected, on the one hand, the presence of a placement event and, on the one hand, the underlying surface on which cooktop utensil 12 has been placed. Thus, it is not necessary to manually actuate control element 23. However, for reasons of redundancy, for example, it is advantageous that the wake-up signal can also be generated using control element 23 in the above-described manner. In the present exemplary embodiment, the evaluation of output signals of sensor 17 is performed directly in cooktop utensil 12. Transmitter unit 16 and sensor 17 are supplied with operating power by the voltage that is induced by heating coil 8 into the induction coil 14 of the cooktop utensil 12 that is placed on the cooking zone 6 associated with this heating coil 8.

The electric power with which cooktop controller 10 drives heating coil 8 in ready mode B has an average value of less than or equal to 30 W, preferably less than or equal to 15 W. Furthermore, the electric power with which cooktop controller 10 drives heating coil 8 in ready mode B has a pause/power ratio of greater than or equal to 1000:1, namely energization during a time interval of 160 µs as compared to a pause interval of 2 s. In this way, on the one hand, cooktop utensil 12 is prevented from being effectively heated for a preparation operation and, on the other hand, signal transmission between transmitter unit 16 and receiver unit 18 is enabled by means of heating coil 8. Moreover, transmission of an operating power from inductive cooktop 4 to the cooktop utensil 12 that is placed on the cooking zone 6 associated with this heating coil 8 is enabled by means of heating coil 8.

With switching inductive cooktop 4 from its standby mode S to its ready mode B, cooktop controller 10 starts the automatic correlation of cooktop utensil 12 with the above-mentioned cooking zone 6 of inductive cooktop 4, which has already been explained above. Thus, a processing routine for automatically correlating cooktop utensil 12 with at least one of the cooking zones 6 of inductive cooktop 4 is started as a function of a placement event detected by sensor 17 or of an underlying surface on which cooktop utensil 12 has been placed and which is detected by sensor 17.

In accordance with the above explanations, the correlation of cooktop utensil 12 with the cooking zone 6 shown bottom right in the plane of FIG. 1, and thus with the heating coil 8 that corresponds to this cooking zone 6, was successful, so that cooktop controller 10 automatically switches inductive cooktop 4 of system 2 from ready mode B to operating mode E. The user may select a power setting L1 for this heating coil 8 on inductive cooktop 4, for example by way of the above-mentioned number string Z1. In the present exemplary embodiment, it is also possible that the user may select a power setting L1 for the aforementioned heating coil 8 using control elements Z2 of cooktop utensil 12. Control elements Z2 of cooktop utensil 12 are not shown. Thus, the user can select the power supplied to the aforementioned heating coil 8 directly on inductive cooktop 4 on the one hand, and on cooktop utensil 12 on the other hand.

Unless no automatic correlation of cooktop utensil 12 with one of the cooking zones 6 of inductive cooktop 4 of system 2 occurs, for example because cooktop utensil 12 has not been placed on any of the cooking zones 6 of inductive cooktop 4, cooktop controller 10 automatically switches inductive cooktop 4 from ready mode B back to standby mode S, for example after a predetermined period of time stored in cooktop controller 10 has elapsed. See FIG. 6, middle row, at bottom.

Automatic correlation of cooktop utensil 12 with one of the cooking zones 6 might not be possible, for example, because cooktop utensil 12 has been placed, for example, on a wooding trivet on a table. In this case, it may be provided that information be output to the user by cooktop utensil output unit 26 as a function of the placement event detected by sensor 17 or of the underlying surface on which cooktop utensil 12 has been placed and which is detected by sensor 17. It is conceivable, for example, that in the case of a cooktop utensil 12 having residual heat, information in the form of a warning signal may be output if sensor 17 detects that the underlying surface on which cooktop utensil 12 has been placed is not one of the cooking zones 6 of inductive cooktop 4, but a surface made of wood or fabric material, such as, for example, the above-mentioned trivet. The user may also receive information when sensor 17 detects that cooktop utensil 12 has been placed on inductive cooktop 4.

In the present exemplary embodiment, analogously to the above-described switching of inductive cooktop 4 from its OFF mode A to its operating mode E, it is also possible to switch inductive cooktop 4 from standby mode S directly to operating mode E. In this regard, see also FIG. 6, middle row, at top.

In the present exemplary embodiments of the method according to the present invention, in ready mode B and in operating mode E of inductive cooktop 4, the individual heating coils 8 of cooktop 4 are, for example, continuously successively driven at predetermined time intervals independently of a wake-up signal. See above. Thus, in the present exemplary embodiments of the method according to the present invention, in ready mode B and in operating mode E of inductive cooktop 4, the driving of the individual heating coils 8 of inductive cooktop 4 with their respective power profiles occurs continuously as a function of at least one predetermined time interval. In this regard, see, for example, FIG. 6, bottommost row.

The automatic switching of inductive cooktop 4 from its ready mode B to its operating mode E is effected, on the one hand, by the above already described user action, and thus analogously to the switching from OFF mode A to operating mode E. On the other hand, the switching from ready mode B to operating mode E is performed automatically by a successful correlation of cooktop utensil 12, on the one hand, with one of the cooking zones 6 of inductive cooktop 4 on the other hand.

The present invention is not limited to the present exemplary embodiments. For example, the present invention may also be advantageously used with other cookware items. Moreover, it is conceivable for the cooktop utensil to take the form of an adapter for a cookware item.

Instead of the purely successive driving of the heating coils, the heating coils of the cooking zones of the cooktop may also be driven simultaneously for purposes of automatic correlation. A combination of successive driving and simultaneous driving is, in principle, also possible, namely by driving the heating coils of the cooking zones of the cooktop simultaneously in a first phase and successively in a second phase for purposes of automatic correlation.

If the case of the simultaneous driving of the heating coils, it is conceivable that when the heating coils of the cooking zones are driven simultaneously, the thereby generated power profiles of the heating coils of the individual cooking zones may differ from one another. In the case of the successive driving of the heating coils described in the exemplary embodiments, in a departure from the exemplary embodiments, this is not absolutely necessary. This is because in the case of successive driving, only one heating coil is driven at a time.

It is also conceivable that the transmitter unit of the cooktop utensil may delay the transmission of the response signal to the receiver unit as a function of an individual delay time stored in the transmitter unit. This is useful in particular when a plurality of cooktop utensils are placed on one cooking zone.

In order to handle the aforementioned case where a plurality of cooktop utensils are placed on one cooking zone, it may be provided to buffer the response signal in the transmitter unit. Accordingly, the response signals of the individual cooktop utensils can be transmitted in an ordered transmission sequence.

For this purpose and for other use cases, it may be useful that the operating power coupled by the at least one heating coil of the cooktop into the induction coil of the cooktop utensil that is placed on this cooking zone be at least partially stored in an energy storage device of the cooktop utensil.

As described earlier, the parameter that correlates with the power profile and is transmitted to the cooktop controller by way of the response signal may be the power profile itself. However, in order to reduce the transmission bandwidth, it is also conceivable that at least one electrical parameter and/or a magnetic parameter that characterizes the power profile and directly correlates with the power profile be transmitted instead of the power profile. It is also conceivable that merely an identifier that corresponds to the power profile and is stored in the cooktop utensil may be transmitted in the correlation signal to the cooktop controller.

Instead of such an identifier, it is also possible to use, for example, at least one frequency of power peaks and power valleys that is characteristic of the power profile and/or the number of power peaks and/or power valleys in the power profile and/or the length of features which are characteristic of the power profile, such as, for example, power peaks and/or power valleys. The power profile may also be treated as a digital transmission, a result thereof being transmitted to the cooktop controller as a binary or hexadecimal number by way of the response signal.

As explained in the above exemplary embodiments, the correlation signals may take the form of power profiles. However, this is not absolutely necessary. In this regard, see also the above description of advantages. Accordingly, the above explanations regarding the correlation signals in the form of power profiles apply analogously to other types of correlation signals.

In addition the correlation signal contents according to the above-described exemplary embodiments, the response signal may also contain additional information on an operating setting of the cooktop utensil and/or an operating parameter of the cooktop utensil and/or an operating state of the cooktop utensil. For example, it may be provided that a preparation temperature preselected on a cooktop utensil in the form of a tea maker for the tea to be heated be transmitted by way of the response signal to the cooktop controller for driving the heating coil associated with the tea maker. It is also possible that a temperature of the cooktop utensil and/or a power required for cooking with a cooktop utensil in the form of a cookware item be transmitted by way of the response signal to the cooktop controller for driving the at least one heating coil. The latter may be useful, for example, when the cooktop utensil is placed on several cooking zones and the heating coils associated therewith.

In addition to the trigger events exemplarily described by way of the exemplary embodiments of the inventive method, it may be that, for purposes of automatic correlation, the heating coils of the cooking zones of the cooktop are driven by the cooktop controller as a function of at least one trigger event that is dependent on the cooktop and/or the cooktop utensil and/or the third device.

Furthermore, the induced current and/or the induced voltage and/or a movement of at least one object (e.g., MEMS) mounted on the cooktop utensil, magnetic nanoparticles embedded in a solid, liquid or gel-like matrix and/or a force exerted on such an object and/or a changed magnetization/ magnetization direction of such an object can be used for the response signal.

In contrast to the described embodiments and the above explanations, the system may additionally include a third device having a receiver unit and an evaluation unit, the third device being connected in signal communication with the cooktop controller. Accordingly, it is also conceivable that the response signal may additionally or alternatively be transmitted to the third device. Analogously to the cooktop controller, the evaluation of the response signal may be partially or completely performed in the third device. The third device may be, for example, a smartphone, a tablet, a computer or a central user interface that is used for controlling multiple kitchen appliances.

An advantageous refinement of the described exemplary embodiments, namely that the correlation signals of the heating coils of the individual cooking zones, which are generated by respective driving operations, differ from each other, provides that the correlation signals of the heating coils of the individual cooking zones, which are generated by respective driving operations, each have encoded therein a different delay time, the transmitter unit of the cooktop utensil that is placed on a particular cooking zone delaying the transmission of the response signal to the receiver unit as a function of the encoded delay time of the heating coil of this cooking zone. This provides a particularly simple way of distinguishing the correlation signals with which the individual heating coils of the cooking zones are driven by the cooktop controller and, thus, of distinguishing the individual cooking zones. This refinement is especially advantageous when the heating coils of the cooking zones are driven simultaneously. Analogously to the exemplary embodiments, the correlation signals take the form of, for example, power profiles.

An advantageous refinement of the aforementioned embodiment provides that the encoded delay times of the correlation signals generated for driving the heating coils be configurable. For example, the encoded delay times could be configured to allow compensation for the resulting different processing times in a plurality of cooktop utensils placed on cooking zones of the cooktop at the same time. Accordingly, it would be possible for the respective response signals of the individual cooktop utensils to be processed with a uniform offset between the driving of the heating coils of each of the plurality of cooking zones and the reception of the response signals by the receiver unit. Moreover, the aforementioned configuration could, for example, be dynamically adapted to enable shortest possible response times of the cooktop, namely automatic correlation of the at least one cooktop utensil with a particular cooking zone of the plurality of cooking zones within the shortest possible time, in the case of varying constellations of the at least one cooktop utensil placed on the cooktop. For example, the encoded delay times could be dynamically configured such that the cooktop controller detects which cooktop utensils are placed on the cooktop at one point in time and, as a function of the placed cooktop utensil with the longest processing time, configures the encoded delay times for the heating coils that correspond to the cooking zones of the other cooktop utensils placed on the cooktop in such a way that the response signals of the other cooktop utensils placed on these cooking zones and the cooktop utensil with the longest processing time have substantially the same offset between the driving of the heating coils of each of the plurality of cooking zones and the reception of the response signal by the receiver unit.

Another advantageous refinement provides that the correlation of the cooktop utensil placed on a particular cooking zone of the plurality of cooking zones with this particular cooking zone be performed in the evaluation unit by way of an overall time lag between the driving of the at least one heating coil associated with this cooking zone with the correlation signal and the reception by the receiver unit of the response signal of the cooktop utensil placed on this cooking zone. This provides an alternative or additional way of automatically correlating the at least one cooktop utensil with a particular cooking zone of the plurality of cooking zones of the cooktop. Accordingly, it is conceivable for the automatic correlation to be performed on the basis of different correlation signals of the heating coils of the individual cooking zones of the cooktop and/or on the basis of overall time lags for every possible pairing of the plurality of cooking zones with the at least one cooktop utensil.

An advantageous refinement of the aforementioned embodiment provides that, for every possible pairing of the plurality of cooking zones with the at least one cooktop utensil, an overall time lag is predetermined and stored in a memory that is in signal communication with the cooktop controller or the third device. In this way, the present invention is implemented in a particularly simple manner. The memory may take the form of, for example, a cloud connected in signal communication with the cooktop controller or the third device. The overall time lags may be stored in the memory as a list or as an algorithm. In comparison with a list, an algorithm is advantageous when a large number of correlations needs to be handled in the memory.

An advantageous refinement according to any of the latter two embodiments provides that a partial time lag of the overall time lag, which partial time lag is dependent on a cooktop utensil placed on a particular cooking zone of the plurality of cooking zones, be transmitted from the transmitter unit of this cooktop utensil to the receiver unit by way of the response signal, and that the overall time lag be determined in the evaluation unit by way of the partial time lag. In this way, specific properties of the at least one cooktop utensil, such as, for example, the installed hardware and/or the loaded firmware, which may influence the partial time lag of the overall time lag, which partial time lag is dependent on the particular cooktop utensil, can be taken into account in the determination of the overall time lag. Accordingly, the automatic correlation of the at least one cooktop utensil with a particular cooking zone of the plurality of cooking zones is qualitatively improved.

A particularly advantageous refinement of the latter three embodiments provides that, in the case of correlation signals having configurable encoded delay times, the identification of a particular cooktop utensil of the at least one cooktop utensil be performed by the evaluation unit as a function of the overall time lag for every possible pairing of the plurality of cooking zones with the at least one cooktop utensil, the overall time lag being different for every possible pairing of the plurality of cooking zones with the at least one cooktop utensil. This simplifies the inventive method because the evaluation of the overall time lag in the evaluation unit serves not only used to automatically correlate this individual cooktop utensil with a particular cooking zone of the plurality of cooking zones of the cooktop, but also to identify this individual cooktop utensil.

It is also conceivable that the automatic correlation may be performed on the basis of different correlation signals of the heating coils of the individual cooking zones of the cooktop and additionally on the basis of different overall time lags for every possible pairing of the plurality of cooking zones with the at least one cooktop utensil. In this way, the automatic correlation of the at least one cooktop utensil with a particular cooking zone of the plurality of cooking zones of the cooktop is improved in quality. Alternatively, it would be possible to use another known method for automatically correlating the cooktop utensil and the cooking zone in the inventive in addition to the two aforementioned options. Moreover, a further improvement of the automatic correlation can be achieved when the aforementioned methods are used in combination with one another in the method according to the present invention.

In other embodiments of the present invention, it may be provided that the inductive cooktop additionally be operated by the cooktop controller in a demonstration mode, the inductive cooktop being switched to the demonstration mode by a switchover signal received by the receiver unit of the cooktop controller, and the demonstration mode substantially corresponding to the ready mode, except that automatic switching from the demonstration mode to the operating mode is not possible. This makes it possible to use the functionality of the inductive cooktop in its ready mode for demonstration purposes, for example at trade shows, without the risk of the inductive cooktop being unintentionally switched to the operating mode. Accordingly, safety is fully ensured also in the demonstration mode of the inductive cooktop.

Furthermore, it may be provided that a fill volume in the cooktop utensil and/or a condition of the medium that is relevant for the preparation of the medium be detected as a function of output signals of the sensor. In this way, the functionality of the sensor is further enhanced. For example, alternatively or in addition to the fill volume of the medium in the cooktop utensil, it could be detected whether the medium has reached its boiling point. It is also conceivable to determine the boiling appearance of the medium; i.e., the boiling behavior of the medium, in particular in relation to the density of the supplied heating power. Furthermore, the method according to the present invention may be used to prevent noise emission during the preparation operation. This may be achieved, for example, by adjusting an operating frequency of the heating coil as a function of output signals of the sensor so as to prevent the occurrence of resonance in the individual cooktop utensil. In addition, the evaluation of the output signals of sensor may at least partially be performed in the cooktop controller and/or in a third device that is in signal communication with the cooktop controller.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automatically correlating at least one cooktop utensil with at least one cooking zone of an inductive cooktop having a plurality of cooking zones which are inductively heated by at least one respective heating coil, the method comprising:
   providing the cooktop with a cooktop controller configured to drive the at least one respective heating coil with a correlation signal;
   providing the at least one cooktop utensil with an induction coil inductively couplable with the at least one respective heating coil of the cooktop and a transmitter unit;
   supplying the transmitter unit with an operation power when a voltage is induced by at least one of the at least one respective heating coil into the induction coil of the cooktop utensil that is placed on the cooking zone associated with the at least one of the at least one respective heating coil;
   transmitting, by the transmitter unit of the cooktop utensil, by the operating power, a response signal that identifies the cooktop utensil and correlates with the correlation signal induced into the induction coil of the cooktop utensil by the at least one of the at least one respective heating coil associated with the cooking zone to a receiver unit of the cooktop controller or of a third device that is in signal communication with the cooktop controller;
   comparing the response signal, in an evaluation unit of the cooktop controller or of the third device, which evaluation unit is connected in signal communication with the receiver unit, to the correlation signal of the at least one respective heating coil of the cooking zone; and
   correlating the identified cooktop utensil with the cooking zone as a function of the comparison,
   wherein the correlation signals of the at least one respective heating coil of the individual cooking zones, which are generated by respective driving operations, differ from each other, and
   wherein the correlation signals of the at least one respective heating coil of the individual cooking zones, which are generated by a driving thereof, each have encoded therein a different delay time, the transmitter unit of the cooktop utensil placed on a particular cooking zone delaying the transmission of the response signal to the receiver unit as a function of the encoded delay time of the at least one respective heating coil of the particular cooking zone.

2. The method as recited in claim 1, wherein the at least one respective heating coil of the cooking zones of the cooktop is driven successively for purposes of automatic correlation, or the at least one respective heating coil of the cooking zones of the cooktop is driven simultaneously for purposes of automatic correlation.

3. The method of any of claim 1, wherein the correlation of the cooktop utensil placed on a particular cooking zone of the plurality of cooking zones with the particular cooking zone is performed in the evaluation unit by way of an overall time lag between a driving of the at least one respective heating coil associated with the particular cooking zone with the correlation signal and a reception by the receiver unit of the response signal of the cooktop utensil placed on the particular cooking zone.

4. The method of claim 1, wherein the response signal contains additional information on an operating setting of the cooktop utensil and/or an operating parameter of the cooktop utensil and/or an operating state of the cooktop utensil.

5. The method of claim 1, wherein, for purposes of automatic correlation, the at least one respective heating coil of the cooking zones of the cooktop is driven by the cooktop controller as a function of at least one trigger event that is dependent on the cooktop and/or the cooktop utensil and/or the third device.

6. The method of claim 5, wherein the trigger event occurs continuously as a function of at least one predetermined time interval when the cooktop is on, or wherein the trigger event occurs as a function of at least one change in a correlation of the at least one cooktop utensil with at least one of the cooking zones of the plurality of cooking zones.

7. The method of claim 1, wherein, in a standby mode of the inductive cooktop, the at least one respective heating coil is not driven by the cooktop controller and, in an operating mode of the inductive cooktop, the at least one respective heating coil is driven to heat a cooktop utensil with the transmitter unit which cooktop utensil is placed on the cooking zone, the inductive cooktop additionally being operated by the cooktop controller in a ready mode, and the inductive cooktop being switched from the standby mode to the ready mode by a wake-up signal received by the receiver unit of the cooktop controller, and, in the ready mode, the at least one respective heating coil being driven by the cooktop controller such that, on one hand, the cooktop utensil is prevented from being effectively heated for a preparation operation and, on an other hand, signal transmission between the transmitter unit and the receiver unit is enabled by the at least one respective heating coil.

8. The method of claim 7, wherein, in the ready mode, the at least one respective heating coil is driven by the cooktop controller such that transmission of an operating power from the inductive cooktop to the cooktop utensil placed on the cooking zone associated with the at least one respective heating coil is enabled by the at least one respective heating coil.

9. The method of claim 7, wherein the wake-up signal is generated by:
   actuation of a control element that is provided on the cooktop utensil and is in signal communication with the transmitter unit, and/or
   a motion sensor that is mounted on the cooktop utensil and is in signal communication with the transmitter unit, and/or
   actuation of a control element that is provided on the inductive cooktop and is in signal communication with the receiver unit of the cooktop controller, and/or
   actuation of a control element that is provided on a third device and is in signal communication with the receiver unit of the cooktop controller.

10. The method of claim 7, wherein an electric power with which the cooktop controller drives the at least one respective heating coil in the ready mode has an average value of less than or equal to 30 W, and/or
   wherein an electric power with which the cooktop controller drives the at least one respective heating coil in the ready mode has a pause/power ratio of greater than or equal to 1000:1.

11. The method of claim 7, wherein the automatic correlation of at least one cooktop utensil with at least one cooking zone of the inductive cooktop having a plurality of cooking zones which are inductively heated by the at least one respective heating coil is performed in the ready mode.

12. The method of claim 11, wherein the inductive cooktop is automatically switched from the ready mode to the operating mode by the cooktop controller and as a function of the response signal received by receiver unit in the ready mode.

13. The method of claim 1, wherein the driving of the at least one respective heating coil is performed as a function of a placement event detected by a sensor or of an underlying surface on which the cooktop utensil has been placed and which is detected by the sensor, and/or
   wherein a processing routine for automatically correlating the cooktop utensil with at least one cooking zone of the inductive cooktop is started as a function of a placement event detected by the sensor or of an underlying surface on which the cooktop utensil has been placed and which is detected by the sensor.

14. A method for automatically correlating at least one cooktop utensil with at least one cooking zone of an inductive cooktop having a plurality of cooking zones which are inductively heated by at least one respective heating coil, the method comprising:
   providing the cooktop with a cooktop controller configured to drive the at least one respective heating coil with a correlation signal;
   providing the at least one cooktop utensil with an induction coil inductively couplable with the at least one respective heating coil of the cooktop and a transmitter unit;
   supplying the transmitter unit with an operation power when a voltage is induced by at least one of the at least one respective heating coil into the induction coil of the cooktop utensil that is placed on the cooking zone associated with the at least one of the at least one respective heating coil;
   transmitting, by the transmitter unit of the cooktop utensil, by the operating power, a response signal that identifies the cooktop utensil and correlates with the correlation signal induced into the induction coil of the cooktop utensil by the at least one of the at least one respective heating coil associated with the cooking zone to a receiver unit of the cooktop controller or of a third device that is in signal communication with the cooktop controller;
   comparing the response signal, in an evaluation unit of the cooktop controller or of the third device, which evaluation unit is connected in signal communication with the receiver unit, to the correlation signal of the at least one respective heating coil of the cooking zone; and
   correlating the identified cooktop utensil with the cooking zone as a function of the comparison,
   wherein the correlation of the cooktop utensil placed on a particular cooking zone of the plurality of cooking zones with the particular cooking zone is performed in the evaluation unit by way of an overall time lag between a driving of the at least one respective heating coil associated with the particular cooking zone with the correlation signal and a reception by the receiver unit of the response signal of the cooktop utensil placed on the particular cooking zone, and
   wherein for every possible pairing of the plurality of cooking zones with the at least one cooktop utensil, the overall time lag is predetermined and stored in a memory that is in signal communication with the cooktop controller or the third device.

15. The method of claim 14, wherein identification of a particular cooktop utensil of the at least one cooktop utensil is performed by the evaluation unit as a function of the overall time lag for every possible pairing of the plurality of cooking zones with the at least one cooktop utensil, the overall time lag being different for every possible pairing of the plurality of cooking zones with the at least one cooktop utensil.

16. The method as recited in claim 14, wherein the at least one respective heating coil of the cooking zones of the cooktop is driven successively for purposes of automatic correlation, or the at least one respective heating coil of the cooking zones of the cooktop is driven simultaneously for purposes of automatic correlation.

17. The method of claim 14, wherein the correlation signals of the at least one respective heating coil of the individual cooking zones, which are generated by respective driving operations, differ from each other.

18. The method of any of claim 14, wherein the correlation of the cooktop utensil placed on a particular cooking zone of the plurality of cooking zones with the particular cooking zone is performed in the evaluation unit by way of an overall time lag between a driving of the at least one respective heating coil associated with the particular cooking zone with the correlation signal and a reception by the receiver unit of the response signal of the cooktop utensil placed on the particular cooking zone.

19. The method of claim 14, wherein the response signal contains additional information on an operating setting of the cooktop utensil and/or an operating parameter of the cooktop utensil and/or an operating state of the cooktop utensil.

20. The method of claim 14, wherein, for purposes of automatic correlation, the at least one respective heating coil of the cooking zones of the cooktop is driven by the cooktop controller as a function of at least one trigger event that is dependent on the cooktop and/or the cooktop utensil and/or the third device.

21. The method of claim 20, wherein the trigger event occurs continuously as a function of at least one predetermined time interval when the cooktop is on, or
wherein the trigger event occurs as a function of at least one change in a correlation of the at least one cooktop utensil with at least one of the cooking zones of the plurality of cooking zones.

22. The method of claim 14, wherein, in a standby mode of the inductive cooktop, the at least one respective heating coil is not driven by the cooktop controller and, in an operating mode of the inductive cooktop, the at least one respective heating coil is driven to heat a cooktop utensil with the transmitter unit which cooktop utensil is placed on the cooking zone, the inductive cooktop additionally being operated by the cooktop controller in a ready mode, and the inductive cooktop being switched from the standby mode to the ready mode by a wake-up signal received by the receiver unit of the cooktop controller, and, in the ready mode, the at least one respective heating coil being driven by the cooktop controller such that, on one hand, the cooktop utensil is prevented from being effectively heated for a preparation operation and, on an other hand, signal transmission between the transmitter unit and the receiver unit is enabled by the at least one respective heating coil.

23. The method of claim 22, wherein, in the ready mode, the at least one respective heating coil is driven by the cooktop controller such that transmission of an operating power from the inductive cooktop to the cooktop utensil placed on the cooking zone associated with the at least one respective heating coil is enabled by the at least one respective heating coil.

24. The method of claim 22, wherein the wake-up signal is generated by:
actuation of a control element that is provided on the cooktop utensil and is in signal communication with the transmitter unit, and/or
a motion sensor that is mounted on the cooktop utensil and is in signal communication with the transmitter unit, and/or
actuation of a control element that is provided on the inductive cooktop and is in signal communication with the receiver unit of the cooktop controller, and/or
actuation of a control element that is provided on a third device and is in signal communication with the receiver unit of the cooktop controller.

25. The method of claim 22, wherein an electric power with which the cooktop controller drives the at least one respective heating coil in the ready mode has an average value of less than or equal to 30 W, and/or
wherein an electric power with which the cooktop controller drives the at least one respective heating coil in the ready mode has a pause/power ratio of greater than or equal to 1000:1.

26. The method of claim 22, wherein the automatic correlation of at least one cooktop utensil with at least one cooking zone of the inductive cooktop having a plurality of cooking zones which are inductively heated by the at least one respective heating coil is performed in the ready mode.

27. The method of claim 26, wherein the inductive cooktop is automatically switched from the ready mode to the operating mode by the cooktop controller and as a function of the response signal received by receiver unit in the ready mode.

28. The method of claim 26, wherein the inductive cooktop is automatically switched from the ready mode to the operating mode by the cooktop controller and as a function of the response signal received by receiver unit in the ready mode.

29. The method of claim 14, wherein the driving of the at least one respective heating coil is performed as a function of a placement event detected by a sensor or of an underlying surface on which the cooktop utensil has been placed and which is detected by the sensor, and/or
wherein a processing routine for automatically correlating the cooktop utensil with at least one cooking zone of the inductive cooktop is started as a function of a placement event detected by the sensor or of an underlying surface on which the cooktop utensil has been placed and which is detected by the sensor.

30. A method for automatically correlating at least one cooktop utensil with at least one cooking zone of an inductive cooktop having a plurality of cooking zones which are inductively heated by at least one respective heating coil, the method comprising:
providing the cooktop with a cooktop controller configured to drive the at least one respective heating coil with a correlation signal;
providing the at least one cooktop utensil with an induction coil inductively couplable with the at least one respective heating coil of the cooktop and a transmitter unit;
supplying the transmitter unit with an operation power when a voltage is induced by at least one of the at least one respective heating coil into the induction coil of the cooktop utensil that is placed on the cooking zone associated with the at least one of the at least one respective heating coil;
transmitting, by the transmitter unit of the cooktop utensil, by the operating power, a response signal that identifies the cooktop utensil and correlates with the correlation signal induced into the induction coil of the cooktop utensil by the at least one of the at least one respective heating coil associated with the cooking zone to a receiver unit of the cooktop controller or of a third device that is in signal communication with the cooktop controller;
comparing the response signal, in an evaluation unit of the cooktop controller or of the third device, which evaluation unit is connected in signal communication with the receiver unit, to the correlation signal of the at least one respective heating coil of the cooking zone; and correlating the identified cooktop utensil with the cooking zone as a function of the comparison, wherein the correlation of the cooktop utensil placed on a particular cooking zone of the plurality of cooking zones with the particular cooking zone is performed in the evaluation unit by way of an overall time lag between a driving of the at least one respective heating coil associated with the particular cooking zone with the correlation signal and a reception by the receiver unit of the response signal of the cooktop utensil placed on the particular cooking zone, and wherein a partial time lag of the overall time lag, which partial time lag is dependent on a cooktop utensil placed on a particular cooking zone of the plurality of cooking zones, is transmitted from the transmitter unit of the cooktop utensil to the receiver unit by the response signal, and the overall time lag is determined in the evaluation unit by way of the partial time lag.

31. The method as recited in claim 30, wherein the at least one respective heating coil of the cooking zones of the cooktop is driven successively for purposes of automatic correlation, or the at least one respective heating coil of the cooking zones of the cooktop is driven simultaneously for purposes of automatic correlation.

32. The method of claim 30, wherein the correlation signals of the at least one respective heating coil of the individual cooking zones, which are generated by respective driving operations, differ from each other.

33. The method of any of claim 30, wherein the correlation of the cooktop utensil placed on a particular cooking zone of the plurality of cooking zones with the particular cooking zone is performed in the evaluation unit by way of an overall time lag between a driving of the at least one respective heating coil associated with the particular cooking zone with the correlation signal and a reception by the receiver unit of the response signal of the cooktop utensil placed on the particular cooking zone.

34. The method of claim 30, wherein the response signal contains additional information on an operating setting of the cooktop utensil and/or an operating parameter of the cooktop utensil and/or an operating state of the cooktop utensil.

35. The method of claim 30, wherein, for purposes of automatic correlation, the at least one respective heating coil of the cooking zones of the cooktop is driven by the cooktop controller as a function of at least one trigger event that is dependent on the cooktop and/or the cooktop utensil and/or the third device.

36. The method of claim 35, wherein the trigger event occurs continuously as a function of at least one predetermined time interval when the cooktop is on, or wherein the trigger event occurs as a function of at least one change in a correlation of the at least one cooktop utensil with at least one of the cooking zones of the plurality of cooking zones.

37. The method of claim 30, wherein, in a standby mode of the inductive cooktop, the at least one respective heating coil is not driven by the cooktop controller and, in an operating mode of the inductive cooktop, the at least one respective heating coil is driven to heat a cooktop utensil with the transmitter unit which cooktop utensil is placed on the cooking zone, the inductive cooktop additionally being operated by the cooktop controller in a ready mode, and the inductive cooktop being switched from the standby mode to the ready mode by a wake-up signal received by the receiver unit of the cooktop controller, and, in the ready mode, the at least one respective heating coil being driven by the cooktop controller such that, on one hand, the cooktop utensil is prevented from being effectively heated for a preparation operation and, on an other hand, signal transmission between the transmitter unit and the receiver unit is enabled by the at least one respective heating coil.

38. The method of claim 37, wherein, in the ready mode, the at least one respective heating coil is driven by the cooktop controller such that transmission of an operating power from the inductive cooktop to the cooktop utensil placed on the cooking zone associated with the at least one respective heating coil is enabled by the at least one respective heating coil.

39. The method of claim 37, wherein the wake-up signal is generated by:

actuation of a control element that is provided on the cooktop utensil and is in signal communication with the transmitter unit, and/or a motion sensor that is mounted on the cooktop utensil and is in signal communication with the transmitter unit, and/or actuation of a control element that is provided on the inductive cooktop and is in signal communication with the receiver unit of the cooktop controller, and/or actuation of a control element that is provided on a third device and is in signal communication with the receiver unit of the cooktop controller.

40. The method of claim 37, wherein an electric power with which the cooktop controller drives the at least one respective heating coil in the ready mode has an average value of less than or equal to 30 W, and/or wherein an electric power with which the cooktop controller drives the at least one respective heating coil in the ready mode has a pause/power ratio of greater than or equal to 1000:1.

41. The method of claim 37, wherein the automatic correlation of at least one cooktop utensil with at least one cooking zone of the inductive cooktop having a plurality of cooking zones which are inductively heated by the at least one respective heating coil is performed in the ready mode.

42. The method of claim 30, wherein the driving of the at least one respective heating coil is performed as a function of a placement event detected by a sensor or of an underlying surface on which the cooktop utensil has been placed and which is detected by the sensor, and/or wherein a processing routine for automatically correlating the cooktop utensil with at least one cooking zone of the inductive cooktop is started as a function of a placement event detected by the sensor or of an underlying surface on which the cooktop utensil has been placed and which is detected by the sensor.

43. A cooktop utensil for an inductive cooktop, comprising:

an induction coil inductively couplable with a heating coil of the inductive cooktop and a transmitter unit, wherein the cooktop utensil has at least one sensor configured to detect a placement event, or configured to detect a placement event and a nature of an underlying surface on which the cooktop utensil has been placed.

44. The cooktop utensil of claim 43, further comprising a control element for manual control by the user, a functionality of the sensor at least partially overlapping with a functionality of the control element.

\* \* \* \* \*